United States Patent
Walter et al.

(10) Patent No.: US 9,447,678 B2
(45) Date of Patent: Sep. 20, 2016

(54) PROTECTION OF ELECTRONIC DEVICES USED WITH PERFORATING GUNS

(71) Applicant: HALLIBURTON ENERGY SERVICES, INC, Houston, TX (US)

(72) Inventors: Patrick L. Walter, Fort Worth, TX (US); John P. Rodgers, Southlake, TX (US); Timothy S. Glenn, Dracut, MA (US); Marco Serra, Winterthur (CH)

(73) Assignee: Halliburton Energy Services, Inc., Houston, TX (US)

( * ) Notice: Subject to any disclaimer, the term of this patent is extended or adjusted under 35 U.S.C. 154(b) by 149 days.

(21) Appl. No.: 14/125,579

(22) PCT Filed: Dec. 19, 2012

(86) PCT No.: PCT/US2012/070740
§ 371 (c)(1),
(2) Date: Dec. 12, 2013

(87) PCT Pub. No.: WO2014/084866
PCT Pub. Date: Jun. 5, 2014

(65) Prior Publication Data
US 2014/0290352 A1    Oct. 2, 2014

Related U.S. Application Data

(60) Provisional application No. 61/732,322, filed on Dec. 1, 2012.

(51) Int. Cl.
*E21B 47/01* (2012.01)
*E21B 43/119* (2006.01)

(52) U.S. Cl.
CPC .......... *E21B 47/011* (2013.01); *E21B 43/1195* (2013.01)

(58) Field of Classification Search
None
See application file for complete search history.

(56) References Cited

U.S. PATENT DOCUMENTS

| 2,797,892 A | 7/1957 | Ryan et al. |
| 2,833,213 A | 5/1958 | Udry |
| 2,980,017 A | 4/1961 | Castel |
| 3,057,296 A | 10/1962 | Silverman |

(Continued)

FOREIGN PATENT DOCUMENTS

| GB | 2406870 A | 4/2005 |
| JP | 0881689 A | 4/1996 |

(Continued)

OTHER PUBLICATIONS

Rodgers, John P., et al., PCT Application entitled "Sensing Shock During Well Perforation", filed Dec. 17, 2010, App. No. PCT/US10/66102.

(Continued)

*Primary Examiner* — Andre Allen
(74) *Attorney, Agent, or Firm* — Chamberlain Hrdlicka

(57) ABSTRACT

A sensing subassembly for use with a downhole tool comprises a housing, a cavity disposed within the housing, at least one electronic component disposed within the cavity, and at least one isolating member disposed within the cavity. The at least one isolating member is configured to attenuate at least a portion of frequency components of a mechanical wave above a threshold and transmit at least a portion of frequency components below the threshold to the at least one electronic device.

20 Claims, 12 Drawing Sheets

(56) References Cited

U.S. PATENT DOCUMENTS

| | | |
|---|---|---|
| 3,128,825 A | 4/1964 | Blagg |
| 3,143,321 A | 8/1964 | McGehee et al. |
| 3,208,378 A | 9/1965 | Boop |
| 3,216,751 A | 11/1965 | Der Mott |
| 3,394,612 A | 7/1968 | Bogosoff et al. |
| 3,414,071 A | 12/1968 | Alberts |
| 3,599,719 A | 8/1971 | Brown |
| 3,653,468 A | 4/1972 | Marshall |
| 3,687,074 A | 8/1972 | Andrews et al. |
| 3,779,591 A | 12/1973 | Rands |
| 3,923,105 A | 12/1975 | Lands, Jr. |
| 3,923,106 A | 12/1975 | Bosse-Platiere |
| 3,923,107 A | 12/1975 | Dillard |
| 3,971,926 A | 7/1976 | Gau et al. |
| 4,269,063 A | 5/1981 | Escaron et al. |
| 4,319,526 A | 3/1982 | DerMott |
| 4,346,795 A | 8/1982 | Herbert |
| 4,409,824 A | 10/1983 | Salama et al. |
| 4,410,051 A | 10/1983 | Daniel et al. |
| 4,419,933 A | 12/1983 | Kirby et al. |
| 4,480,690 A | 11/1984 | Vann |
| 4,575,026 A | 3/1986 | Brittain et al. |
| 4,598,776 A | 7/1986 | Stout |
| 4,612,992 A | 9/1986 | Vann et al. |
| 4,619,333 A | 10/1986 | George |
| 4,637,478 A | 1/1987 | George |
| 4,679,669 A | 7/1987 | Kalb et al. |
| 4,693,317 A | 9/1987 | Edwards et al. |
| 4,694,878 A | 9/1987 | Gambertoglio |
| 4,764,231 A | 8/1988 | Slawinski et al. |
| 4,817,710 A | 4/1989 | Edwards et al. |
| 4,829,901 A | 5/1989 | Yates, Jr. |
| 4,830,120 A | 5/1989 | Stout |
| 4,842,059 A | 6/1989 | Tomek |
| 4,901,802 A | 2/1990 | George et al. |
| 4,913,053 A | 4/1990 | McPhee |
| 4,971,153 A | 11/1990 | Rowe et al. |
| 5,027,708 A | 7/1991 | Gonzalez et al. |
| 5,044,437 A | 9/1991 | Wittrisch |
| 5,078,210 A | 1/1992 | George |
| 5,088,557 A | 2/1992 | Ricles et al. |
| 5,092,167 A | 3/1992 | Finley et al. |
| 5,103,912 A | 4/1992 | Flint |
| 5,107,927 A | 4/1992 | Whiteley et al. |
| 5,109,355 A | 4/1992 | Yuno |
| 5,117,911 A | 6/1992 | Navarette et al. |
| 5,131,470 A | 7/1992 | Miszewski et al. |
| 5,133,419 A | 7/1992 | Barrington |
| 5,161,616 A | 11/1992 | Colla |
| 5,188,191 A | 2/1993 | Tomek |
| 5,216,197 A | 6/1993 | Huber et al. |
| 5,287,924 A | 2/1994 | Burleson et al. |
| 5,320,169 A | 6/1994 | Delatorre |
| 5,343,963 A | 9/1994 | Bouldin et al. |
| 5,351,791 A | 10/1994 | Rosenzweig |
| 5,366,013 A | 11/1994 | Edwards et al. |
| 5,421,780 A | 6/1995 | Vukovic |
| 5,529,127 A | 6/1996 | Burleson et al. |
| 5,547,148 A | 8/1996 | Del Monte et al. |
| 5,598,891 A | 2/1997 | Snider et al. |
| 5,598,894 A | 2/1997 | Burleson et al. |
| 5,603,379 A | 2/1997 | Henke et al. |
| 5,667,023 A | 9/1997 | Harrell et al. |
| 5,774,420 A | 6/1998 | Heysse et al. |
| 5,813,480 A | 9/1998 | Zaleski, Jr. et al. |
| 5,823,266 A | 10/1998 | Burleson et al. |
| 5,826,654 A | 10/1998 | Adnan et al. |
| 5,957,209 A | 9/1999 | Burleson et al. |
| 5,964,294 A | 10/1999 | Edwards et al. |
| 5,992,523 A | 11/1999 | Burleson et al. |
| 6,012,015 A | 1/2000 | Tubel |
| 6,021,377 A | 2/2000 | Dubinsky et al. |
| 6,068,394 A | 5/2000 | Dublin, Jr. |
| 6,078,867 A | 6/2000 | Plumb et al. |
| 6,098,716 A | 8/2000 | Hromas et al. |
| 6,134,892 A | 10/2000 | Turner et al. |
| 6,135,252 A | 10/2000 | Knotts |
| 6,173,779 B1 | 1/2001 | Smith |
| 6,181,642 B1 * | 1/2001 | Coates .......... E21B 23/01 181/105 |
| 6,216,533 B1 | 4/2001 | Woloson et al. |
| 6,230,101 B1 | 5/2001 | Wallis |
| 6,283,214 B1 | 9/2001 | Guinot et al. |
| 6,308,809 B1 | 10/2001 | Reid et al. |
| 6,371,541 B1 | 4/2002 | Pedersen |
| 6,386,296 B1 * | 5/2002 | Kothari et al. .......... 175/4.59 |
| 6,394,241 B1 | 5/2002 | Desjardins et al. |
| 6,397,752 B1 | 6/2002 | Yang et al. |
| 6,408,953 B1 | 6/2002 | Goldman et al. |
| 6,412,415 B1 | 7/2002 | Kothari et al. |
| 6,412,614 B1 | 7/2002 | Lagrange et al. |
| 6,450,022 B1 | 9/2002 | Brewer |
| 6,454,012 B1 | 9/2002 | Reid |
| 6,457,570 B2 | 10/2002 | Reid et al. |
| 6,484,801 B2 | 11/2002 | Brewer et al. |
| 6,543,538 B2 | 4/2003 | Tolman et al. |
| 6,550,322 B2 | 4/2003 | Sweetland et al. |
| 6,595,290 B2 | 7/2003 | George et al. |
| 6,615,949 B1 * | 9/2003 | Egerev et al. .......... 181/102 |
| 6,672,405 B2 | 1/2004 | Tolman et al. |
| 6,674,432 B2 | 1/2004 | Kennon et al. |
| 6,679,323 B2 | 1/2004 | Vargervik et al. |
| 6,679,327 B2 | 1/2004 | Sloan et al. |
| 6,684,949 B1 | 2/2004 | Gabler et al. |
| 6,684,954 B2 | 2/2004 | George |
| 6,708,761 B2 | 3/2004 | George et al. |
| 6,810,370 B1 | 10/2004 | Watts, III |
| 6,826,483 B1 | 11/2004 | Anderson et al. |
| 6,832,159 B2 | 12/2004 | Smits et al. |
| 6,842,725 B1 | 1/2005 | Sarda |
| 6,868,920 B2 | 3/2005 | Hoteit et al. |
| 6,896,059 B2 | 5/2005 | Brooks et al. |
| 7,000,699 B2 | 2/2006 | Yang et al. |
| 7,006,959 B1 | 2/2006 | Huh et al. |
| 7,044,219 B2 | 5/2006 | Mason et al. |
| 7,114,564 B2 | 10/2006 | Parrott et al. |
| 7,121,340 B2 | 10/2006 | Grove et al. |
| 7,139,689 B2 | 11/2006 | Huang |
| 7,147,088 B2 | 12/2006 | Reid et al. |
| 7,165,612 B2 | 1/2007 | McLaughlin |
| 7,178,608 B2 | 2/2007 | Mayes et al. |
| 7,195,066 B2 | 3/2007 | Sukup et al. |
| 7,234,517 B2 | 6/2007 | Streich et al. |
| 7,246,659 B2 | 7/2007 | Fripp et al. |
| 7,260,508 B2 | 8/2007 | Lim et al. |
| 7,278,480 B2 | 10/2007 | Longfield et al. |
| 7,387,160 B2 | 6/2008 | O'Shaughnessy et al. |
| 7,387,162 B2 | 6/2008 | Mooney, Jr. et al. |
| 7,503,403 B2 | 3/2009 | Jogi et al. |
| 7,509,245 B2 | 3/2009 | Siebrits et al. |
| 7,533,722 B2 | 5/2009 | George et al. |
| 7,600,568 B2 | 10/2009 | Ross et al. |
| 7,603,264 B2 | 10/2009 | Zamora et al. |
| 7,640,986 B2 | 1/2010 | Behrmann et al. |
| 7,721,650 B2 | 5/2010 | Barton et al. |
| 7,721,820 B2 | 5/2010 | Hill et al. |
| 7,762,331 B2 | 7/2010 | Goodman et al. |
| 7,770,662 B2 | 8/2010 | Harvey et al. |
| 7,784,532 B2 | 8/2010 | Sevre et al. |
| 7,806,035 B2 | 10/2010 | Kaiser et al. |
| 8,126,646 B2 | 2/2012 | Grove et al. |
| 8,136,608 B2 | 3/2012 | Goodman |
| 8,181,718 B2 | 5/2012 | Burleson et al. |
| 8,186,259 B2 | 5/2012 | Burleson et al. |
| 8,393,393 B2 | 3/2013 | Rodgers et al. |
| 8,397,800 B2 | 3/2013 | Rodgers et al. |
| 8,397,814 B2 | 3/2013 | Rodgers et al. |
| 8,408,286 B2 | 4/2013 | Rodgers et al. |
| 8,714,251 B2 | 5/2014 | Glenn et al. |
| 8,714,252 B2 | 5/2014 | Glenn et al. |
| 2002/0121134 A1 | 9/2002 | Sweetland et al. |
| 2002/0157895 A1 * | 10/2002 | Dubinsky .......... G01V 1/523 181/102 |
| 2003/0062169 A1 | 4/2003 | Marshall |

(56) References Cited

U.S. PATENT DOCUMENTS

| | | |
|---|---|---|
| 2003/0089497 A1 | 5/2003 | George et al. |
| 2003/0106739 A1* | 6/2003 | Arian et al. ............... 181/110 |
| 2003/0150646 A1 | 8/2003 | Brooks et al. |
| 2004/0045351 A1 | 3/2004 | Skinner |
| 2004/0104029 A1 | 6/2004 | Martin |
| 2004/0140090 A1 | 7/2004 | Mason et al. |
| 2004/0201464 A1 | 10/2004 | Oonishi |
| 2005/0023074 A1* | 2/2005 | Dubinsky et al. ............ 181/108 |
| 2005/0241824 A1 | 11/2005 | Burris, II et al. |
| 2005/0241825 A1 | 11/2005 | Burris, II et al. |
| 2005/0241835 A1 | 11/2005 | Burris, II et al. |
| 2005/0269083 A1 | 12/2005 | Burris, II et al. |
| 2006/0000665 A1* | 1/2006 | Shah et al. .................. 181/108 |
| 2006/0048940 A1 | 3/2006 | Hromas et al. |
| 2006/0070734 A1 | 4/2006 | Zillinger et al. |
| 2006/0118297 A1 | 6/2006 | Finci et al. |
| 2006/0243453 A1 | 11/2006 | McKee |
| 2007/0162235 A1 | 7/2007 | Zhan et al. |
| 2007/0193740 A1 | 8/2007 | Quint |
| 2007/0214990 A1 | 9/2007 | Barkley et al. |
| 2007/0267201 A1 | 11/2007 | Brenzinski et al. |
| 2007/0283751 A1 | 12/2007 | Van Der Spek |
| 2008/0030367 A1 | 2/2008 | Fink et al. |
| 2008/0031091 A1 | 2/2008 | Fripp et al. |
| 2008/0041597 A1 | 2/2008 | Fisher et al. |
| 2008/0125335 A1 | 5/2008 | Bhavsar |
| 2008/0149338 A1 | 6/2008 | Goodman et al. |
| 2008/0202325 A1 | 8/2008 | Bertoja et al. |
| 2008/0216554 A1 | 9/2008 | McKee |
| 2008/0245255 A1 | 10/2008 | Barton et al. |
| 2008/0262810 A1 | 10/2008 | Moran et al. |
| 2008/0314582 A1 | 12/2008 | Belani et al. |
| 2009/0013775 A1 | 1/2009 | Bogath et al. |
| 2009/0071645 A1 | 3/2009 | Kenison et al. |
| 2009/0084535 A1 | 4/2009 | Bertoja et al. |
| 2009/0151588 A1 | 6/2009 | Burleson et al. |
| 2009/0151589 A1* | 6/2009 | Henderson et al. .......... 102/333 |
| 2009/0159284 A1 | 6/2009 | Goodman |
| 2009/0168606 A1 | 7/2009 | Lerche et al. |
| 2009/0182541 A1 | 7/2009 | Crick et al. |
| 2009/0223400 A1 | 9/2009 | Hill et al. |
| 2009/0223714 A1* | 9/2009 | Hill et al. .................... 175/2 |
| 2009/0245024 A1 | 10/2009 | Fripp et al. |
| 2009/0272529 A1 | 11/2009 | Crawford |
| 2009/0272839 A1 | 11/2009 | Clingman |
| 2009/0276156 A1 | 11/2009 | Kragas et al. |
| 2009/0294122 A1 | 12/2009 | Hansen et al. |
| 2010/0000789 A1 | 1/2010 | Barton et al. |
| 2010/0011943 A1 | 1/2010 | Quinn et al. |
| 2010/0037793 A1 | 2/2010 | Lee et al. |
| 2010/0051265 A1 | 3/2010 | Hurst et al. |
| 2010/0085210 A1 | 4/2010 | Bonavides et al. |
| 2010/0132939 A1 | 6/2010 | Rodgers |
| 2010/0133004 A1 | 6/2010 | Burleson et al. |
| 2010/0147519 A1 | 6/2010 | Goodman |
| 2010/0230105 A1 | 9/2010 | Vaynshteyn |
| 2010/0300750 A1 | 12/2010 | Hales et al. |
| 2011/0073310 A1 | 3/2011 | Clemens et al. |
| 2011/0073326 A1 | 3/2011 | Clemens et al. |
| 2011/0073329 A1 | 3/2011 | Clemens et al. |
| 2011/0077924 A1* | 3/2011 | Ertas et al. .................. 703/2 |
| 2011/0120772 A1 | 5/2011 | McLoughlin |
| 2011/0162843 A1 | 7/2011 | Maier et al. |
| 2012/0085539 A1 | 4/2012 | Tonnessen et al. |
| 2012/0152519 A1 | 6/2012 | Rodgers et al. |
| 2012/0152614 A1 | 6/2012 | Rodgers et al. |
| 2012/0158388 A1 | 6/2012 | Rodgers et al. |
| 2012/0247832 A1 | 10/2012 | Cramer et al. |
| 2012/0273201 A1* | 11/2012 | Glenn et al. ................. 166/297 |
| 2013/0048375 A1 | 2/2013 | Rodgers et al. |
| 2013/0048376 A1 | 2/2013 | Rodgers et al. |
| 2013/0153295 A1 | 6/2013 | Rodgers et al. |
| 2014/0076564 A1 | 3/2014 | Rodgers et al. |
| 2014/0076631 A1 | 3/2014 | Rodgers et al. |
| 2014/0260591 A1* | 9/2014 | Rodgers et al. ............ 73/152.58 |
| 2014/0262271 A1 | 9/2014 | Martinez et al. |
| 2014/0262503 A1 | 9/2014 | Rodgers et al. |
| 2014/0284137 A1 | 9/2014 | Rodgers et al. |

FOREIGN PATENT DOCUMENTS

| | | |
|---|---|---|
| JP | 2006234142 A | 9/2006 |
| WO | 2004076813 A1 | 9/2004 |
| WO | 2007056121 A1 | 5/2007 |
| WO | 2012082143 A1 | 6/2012 |
| WO | 2012082186 A1 | 6/2012 |
| WO | 2012082195 A1 | 6/2012 |
| WO | 2012148429 A1 | 11/2012 |
| WO | 2014003699 A2 | 1/2014 |
| WO | 2014046655 A1 | 3/2014 |
| WO | 2014046656 A1 | 3/2014 |
| WO | WO2014084866 A1 | 6/2014 |
| WO | WO2014084867 A1 | 6/2014 |
| WO | WO2014084868 A1 | 6/2014 |

OTHER PUBLICATIONS

Rodgers, John P., et al., Patent Application entitled, "Perforation Gun String Energy Propagation Management with Tuned Mass Damper", filed Sep. 5, 2013, U.S. Appl. No. 14/003,234.

Martinez, Samuel, et al., Patent Application entitled, "Shock Attenuator for Gun System", filed Mar. 4, 2013, U.S. Appl. No. 13/820,748.

Rodgers, John P., et al., PCT Application entitled, "Protection of Electronic Devices Used with Perforating Guns", filed Dec. 19, 2012, Int'l Application No. PCT/US12/70741.

Rodgers, John P., et al., Patent Application entitled, "Protection of Electronic Devices Used with Perforating Guns", filed Dec. 12, 2013, U.S. Appl. No. 14/125,577.

Rodgers, John P., et al., PCT Application entitled, "Protection of Electronic Devices Used with Perforating Guns", filed Dec. 19, 2012, Int'l Application No. PCT/US12/70742.

Rodgers, John P., et al., Patent Application entitled, "Protection of Electronic Devices Used with Perforating Guns", filed Dec. 12, 2013, U.S. Appl. No. 14/125,578.

Office Action Restriction dated Jul. 30, 2009, U.S. Appl. No. 11/957,541, filed Dec. 17, 2007.

Office Action dated Sep. 8, 2009, U.S. Appl. No. 11/957,541, filed Dec. 17, 2007.

Office Action dated Feb. 2, 2010, U.S. Appl. No. 11/957,541, filed Dec. 17, 2007.

Office Action dated Jul. 15, 2010, U.S. Appl. No. 11/957,541, filed Dec. 17, 2007.

Office Action dated Nov. 22, 2010, U.S. Appl. No. 11/957,541, filed Dec. 17, 2007.

Notice of Allowance dated Feb. 7, 2011, U.S. Appl. No. 11/957,541, filed Dec. 17, 2007.

Office Action dated May 4, 2011, U.S. Appl. No. 11/957,541, filed Dec. 17, 2007.

Final Office Action dated Oct. 24, 2011, U.S. Appl. No. 11/957,541, filed Dec. 17, 2007.

Notice of Allowance dated Jan. 27, 2012, U.S. Appl. No. 11/957,541, filed Dec. 17, 2007.

Office Action dated Apr. 21, 2011, U.S. Appl. No. 13/008,075, filed Jan. 18, 2011.

Final Office Action dated Oct. 24, 2011, U.S. Appl. No. 13/008,075, filed Jan. 18, 2011.

Advisory Action dated Jan. 17, 2012, U.S. Appl. No. 13/008,075, filed Jan. 18, 2011.

Notice of Allowance dated Jan. 25, 2012, U.S. Appl. No. 13/008,075, filed Jan. 18, 2011.

Office Action dated Jun. 13, 2012, U.S. Appl. No. 13/377,148, filed Dec. 8, 2011.

Final Office Action dated Jan. 18, 2013, U.S. Appl. No. 13/377,148, filed Dec. 8, 2011.

Notice of Allowance dated Apr. 2, 2013, U.S. Appl. No. 13/377,148, filed Dec. 8, 2011.

Notice of Allowance dated Sep. 26, 2013, U.S. Appl. No. 13/377,148, filed Dec. 8, 2011.

(56) References Cited

OTHER PUBLICATIONS

Notice of Allowance dated Jan. 23, 2014, U.S. Appl. No. 13/377,148, filed Dec. 8, 2011.
Restriction Requirement dated Jan. 31, 2013, U.S. Appl. No. 13/594,776, filed Aug. 25, 2012.
Office Action dated Mar. 26, 2013, U.S. Appl. No. 13/594,776, filed Aug. 25, 2012.
Notice of Allowance dated Jul. 11, 2013, U.S. Appl. No. 13/594,776, filed Aug. 25, 2012.
Notice of Allowance dated Oct. 2, 2013, U.S. Appl. No. 13/594,776, filed Aug. 25, 2012.
Notice of Allowance dated Jan. 23, 2014, U.S. Appl. No. 13/594,776, filed Aug. 25, 2012.
Office Action dated Sep. 30, 2013, U.S. Appl. No. 13/895,032, filed May 15, 2013.
Notice of Allowance dated Feb. 20, 2014, U.S. Appl. No. 13/895,032, filed May 15, 2013.
Office Action dated Jan. 27, 2012, U.S. Appl. No. 13/210,303, filed Aug. 15, 2011.
Final Office Action dated Aug. 2, 2012, U.S. Appl. No. 13/210,303, filed Aug. 15, 2011.
Office Action dated Apr. 4, 2013, U.S. Appl. No. 13/210,303, filed Aug. 15, 2011.
Final Office Action dated Sep. 13, 2013, U.S. Appl. No. 13/210,303, filed Aug. 15, 2011.
Advisory Action dated Nov. 27, 2013, U.S. Appl. No. 13/210,303, filed Aug. 15, 2011.
Office Action dated Mar. 21, 2014, U.S. Appl. No. 13/210,303, filed Aug. 15, 2011.
Office Action dated Apr. 10, 2012, U.S. Appl. No. 13/325,726, filed Dec. 14, 2011.
Final Office Action dated Jul. 26, 2012, U.S. Appl. No. 13/325,726 filed Dec. 14, 2011.
Office Action dated Oct. 1, 2012, U.S. Appl. No. 13/325,726, filed Dec. 14, 2011.
Notice of Allowance dated Jan. 23, 2013, U.S. Appl. No. 13/325,726, filed Dec. 14, 2011.
Office Action dated Jun. 29, 2012, U.S. Appl. No. 13/325,866, filed Dec. 14, 2011.
Final Office Action dated Oct. 23, 2012, U.S. Appl. No. 13/325,866 filed Dec. 14, 2011.
Notice of Allowance dated Jan. 24, 2013, U.S. Appl. No. 13/325,866 filed Dec. 14, 2011.
Office Action dated Sep. 6, 2012, U.S. Appl. No. 13/495,035, filed Jun. 13, 2012.
Final Office Action dated Dec. 14, 2012, U.S. Appl. No. 13/495,035.
Notice of Allowance dated Feb. 15, 2013, U.S. Appl. No. 13/495,035.
Office Action dated Jun. 6, 2012, U.S. Appl. No. 13/325,909, filed Dec. 14, 2011.
Final Office Action dated Nov. 19, 2012, U.S. Appl. No. 13/325,909, filed Dec. 14, 2011.
"Fast Gauge Recorder," Perforating Solutions 5-110, Halliburton. Nov. 16, 2010.
Furui, Kenji, "A Comprehensive Skin Factor Model for Well Completions Based on Finite Element Simulations," University of Texas at Austin, 2004.
Grove, B. et al., "Explosion-induced damage to oilwell perforating gun carriers," Structures Under Shock and Impact IX, WIT Transactions on the Built Environment, vol. 87, p. 165-176, WIT Press, 2006.
Grove, B. et al., "New Effective Stress Law for Predicting Perforation Depth at Downhole Conditions," SPE 111778, Society of Petroleum Engineers, 2008.
"Integrated Production Modeling Brochure," Petroleum Experts Ltd., 2008.
Jin, Quiankun et al., "3D Numerical Simulations of Penetrations of Oil-Well Perforator into Concrete Targets," 7th International LS-DYNA Users Conference, Beijing Engineering Software Technology Co., Ltd., Beijing, China. Mar. 2001.

Li, Wet al., "The effect of annular multi-point initiation on the formation and penetration of an explosively formed penetrator," International Journal of Impact Engineering, 2009, doi:10.1016/j.ijimpeng.2009.08.008.
Murilo, Sergio et al., "Optimization and Automation of Modeling of Florw in Perforated Oil Wells," Virtual Product Development Conference, 2004. MSC Software, Huntingon Beach, California, U.S.A.
Ouyang, Liang-Biao et al., "Case Studies for Improving Completion Design Through Comprehensive Well-Performance Modeling," SPE 104078, Society of Petroleum Engineers, 2006.
Ouyang, Liang-Biao et al., "Uncertainty Assessment on Well-Performance Prediction for an Oil Producer Equipped With Selected Completions," SPE 106966, Society of Petroleum Engineers, 2007.
"Perf Breakdown, Fracturing, and Cleanup in PulsFrac®," John F. Schatz Research and Consulting, Inc., May 2, 2007.
"Petroleum Exploration & Production Software, Training & Consulting," v4.12-B, KAPPA Engineering, Jan. 2010.
"Positioning Strain Gages to Monitor Bending, Axial, Shear, and Torsional Loads," Strain Gages E. 2012.
"Problems in High-shock Management," Endevco, MEGGITT. Jul. 2007.
Proett, M.A. et al., "Productivity Optimization of Oil Wells Using a New 3D Finit-Element Wellbore Inflow Model and Artificial Neural Network," Halliburton Energy Services, Inc. 2004.
"PulsFrac™ Summary Technical Description", John F. Schatz Research and Consulting, Inc., 2004.
"PulsFrac™ Validation: Owen/HTH Surface Block Test," John F. Schatz Research and Consulting, Inc., 2004.
Regalbuto, J.A. et al., "Computer Codes for Oilwell-Perforator Design," Halliburton Explosive Products Center, SPE Drilling & Completion, Sep. 1997, p. 188-195, Halliburton Energy Services, Inc.
Rudshaug, Terje, et al., "NETool™ a toolbox for Improved Reservoir Management," FORCE AWTC Seminar—Advanced Wells—Lessons Learned (application experience) and Future Directions/Opportunities, Apr. 21-22, 2004, DPT US, Inc.
Schatz, J.F. et al., "High-Speed Downhole Memory Recorder and Software Used to Design and Confirm Perforating/Propellant Behavior and Formation Fracturing," Society of Petroleum Engineers, Inc., 1999.
Schatz, J.F. et al., "High-Speed Pressure and Accelerometer Measurements Characterize Dynamic Behavior During Perforating Events in Deepwater Gulf of Mexico," SPE 90042, Society of Petroleum Engineers, 2004.
Schatz, John, "The Role of Compressibility in PulsFrac® Software," John F. Schatz Research and Consulting, Inc., Aug. 22, 2007.
"Series 200 High Shock, High Speed Pressure and Acceleration Gauge", IES, Instrumentation and Engineering Services Inc., Aug. 2004, U.S.A.
"Series 300 Gauge," http://www.iesrecorderes.com/oilwell.htm (last visited Sep. 1, 2010), IES Recorders-Oil Well.
"Series 300 High Shock, High Speed Pressure Gauge", Instrumentation and Engineering Services Inc., Feb. 2010, Navarre, FL, U.S.A.
Shepherd, Joseph E., "Structural Response of Piping to Internal Gas Detonation," Proceedings of PVP2006-ICPVT-11, 2006 ASME Pressure Vessels and Piping Division Conference, Jul. 23-27, 2006, Vancouver BC, Canada.
"ShockPro Shockload Evaluation Service—Engineer Perforated Completions to Evaluate the Mechanical Integrity of All System Components," Wireline and Perforating Services, Halliburton Energy Services, Inc. 2007.
"ShockPro Shockload Evaluation Service" Perforating Solutions 5-125, Halliburton Energy Services, Inc. 2007.
"Simulation Software for EquiFlow® ICD Completions," Advanced Completions, HO7010, Halliburton, Sep. 2009.
"SXVA Explosively Initiated Vertical Shock Absorber", product paper 06-WT-066, Schlumberger, 2007.
"Wem—Well Evaluation Model," P.E. Moseley & Associates, Inc., Houston, TX U.S.A. 2009.
FAIPP Pre-Interview Communication dated Jul. 23, 2014, U.S. Appl. No. 14/003,243, filed Sep. 5, 2013.

(56) References Cited

OTHER PUBLICATIONS

FAIPP Office Action dated Aug. 28, 2014, U.S. Appl. No. 14/003,243, filed Sep. 5, 2013.
Office Action dated Jul. 3, 2014, U.S. Appl. No. 13/210,303, filed Aug. 15, 2011.
Final Office Action dated Sep. 19, 2014, U.S. Appl. No. 13/533,600, filed Jun. 26, 2012.
Advisory Action dated Jul. 24, 2014, U.S. Appl. No. 13/493,327, filed Jun. 11, 2012.
Office Action dated Sep. 18, 2014, U.S. Appl. No. 13/493,327, filed Jun. 11, 2012.
Foreign Communication from a Related Counterpart Application, "International Search Report and Written Opinion" dated Aug. 19, 2013, International Application No. PCT/US12/70740 filed on Dec. 19, 2012.
Notice of Allowance dated Feb. 1, 2013, U.S. Appl. No. 13/325,909, filed Dec. 14, 2011.
Office Action dated Dec. 18, 2012, U.S. Appl. No. 13/533,600, filed Jun. 26, 2012.
Final Office Action dated Jun. 20, 2013, U.S. Appl. No. 13/533,600, filed Jun. 26, 2012.
Office Action dated May 16, 2014, U.S. Appl. No. 13/533,600, filed Jun. 26, 2012.
Office Action dated Feb. 24, 2012, U.S. Appl. No. 13/304,075, filed Nov. 23, 2011.
Office Action dated Nov. 7, 2013, U.S. Appl. No. 13/304,075, filed Nov. 23, 2011.
Final Office Action dated Mar. 12, 2014, U.S. Appl. No. 13/304,075, filed Nov. 23, 2011.
Office Action dated Dec. 12, 2012, U.S. Appl. No. 13/493,327, filed Jun. 11, 2012.
Final Office Action dated Jun. 11, 2013, U.S. Appl. No. 13/493,327, filed Jun. 11, 2012.
Final Office Action dated May 19, 2014, U.S. Appl. No. 13/493,327, filed Jun. 11, 2012.
Foreign Communication From a Related Counterpart Application—International Search Report and Written Opinion, PCT/US2011/034690, Oct. 27, 2011.
Foreign Communication From a Related Counterpart Application—International Preliminary Report on Patentability, PCT/US2011/034690, Oct. 29, 2013.
Foreign Communication From a Related Counterpart Application—International Search Report and Written Opinion, PCT/US2010/061102, Jul. 28, 2011.
Foreign Communication From a Related Counterpart Application—International Search Report and Written Opinion, PCT/US2010/061104, Jul. 28, 2011.
Foreign Communication From a Related Counterpart Application—International Search Report and Written Opinion, PCT/US2011/029412, Nov. 22, 2011.
Foreign Communication From a Related Counterpart Application—International Search Report and Written Opinion, PCT/US2011/046955, Dec. 27, 2011.
Foreign Communication From a Related Counterpart Application—International Search Report and Written Opinion, PCT/US2011/061107, Jul. 28, 2011.
Foreign Communication From a Related Counterpart Application—International Search Report and Written Opinion, PCT/US2011/050395, Feb. 17, 2012.
Foreign Communication From a Related Counterpart Application—International Search Report and Written Opinion, PCT/US2011/049882, Feb. 20, 2012.
Foreign Communication From a Related Counterpart Application—International Search Report and Written Opinion, PCT/US2011/050401, Feb. 9, 2012.
Foreign Communication from a Related Counterpart Application, International Search Report and Written Opinion dated Apr. 10, 2013, International Application PCT/US12/56165 filed on Sep. 19, 2012.
Foreign Communication from a Related Counterpart Application, International Search dated Apr. 5, 2013, International Application PCT/US12/56164 filed Sep. 19, 2012.
Foreign Communication from a Related Counterpart Application, International Search dated Jan. 21, 2014, International Application PCT/US12/32004 filed Apr. 3, 2012.
Foreign Communication from a Related Counterpart Application, Chapter II Demand, Article 34 Amendments and Arguments dated Apr. 10, 2014, International Application PCT/US12/32004 filed Apr. 3, 2012.
Foreign Communication from a Related Counterpart Application, Notification of Receipt of Demand by Competent International Preliminary Examining Authority dated Jan. 21, 2014, International Application PCT/US12/32004 filed Apr. 3, 2012.
Foreign Communication from a Related Counterpart Application, International Search dated Aug. 20, 2013, International Application No. PCT/US12/70741, filed Dec. 19, 2012.
Foreign Communication from a Related Counterpart Application, International Search dated Aug. 20, 2013, International Application No. PCT/US12/70742, filed Dec. 19, 2012.
"2010 International Perforating Symposium", Agenda, dated May 6-7, 2010 2 pages.
"Accelerometer Wire Termination," IES, AN106. 2010.
Ager, Scott, IES "Fast Speed Gages," Power Point Presentation; Mar. 2, 2009, Navarre, FL, U.S.A.
Ager, Scott, "IES Housing and High Shock Considerations," Power Point Presentation. Sep. 1, 2010.
Ager, Scott, "IES Introduction," Power Point Presentation, IES, U.S.A. Sep. 1, 2010.
Ager, Scott, "IES Recorder Buildup," Power Point Presentation, U.S.A. Sep. 1, 2010.
Ager, Scott, "Model 64 and 67 Buildup," Power Point Presentation, Oct. 17, 2006, U.S.A.
Ager, Scott, "IES Sensor Discussion," Power Point Presentation. U.S.A. Sep. 1, 2010.
"Analog Recorder Test Example," http://www.iesrecorders.com/highshock.htm (last visited Sep. 1, 2010), IES Recorders-Highshock.
Ansah, Joseph et al., "Advances in Well Completion Design: A New 3D Finite-Element Wellbore Inflow Model for Optimizing Performance of Perforated Completions," Society of Petroleum Engineers, 2002.
"AutoLatch™ Release Gun Connector", Special Applications 6-7, Halliburton. Jan. 9, 2011.
"Battery Packaging for High Shock", IES, AN102. Sep. 1, 2010.
Baumann, Carlos, et al., "Perforating Wellbore Dynamics and Gunshock in Deepwater TCP Operations," Product Information Presentation, IPS-10-018, Schlumberger Reservoir Completions. May 11, 2011.
Blakeborough, A. et al., "Novel Load Cell for Measuring Axial Force, Shear Force, and Bending Movement in Large-scale Structural Experiments," Experimental Mechanics, vol. 42, No. 1, p. 115-122, Mar. 2002.
"Body Lock Ring", Mechanical Downhole Technology Transfer, Halliburton. Oct. 10, 2010.
Bruyere, Frederic et al., "New Practices to Enhance Perforating Results", Oilfield Review, p. 18-35, Autumn 2006.
Canal, et al., "Predicting Pressure Behavior and Dynamic Shock Loads on Completion Hardware During Perforating," May 3-6, 2010.
"Casing Differential in PulsFrac™ Calculations," John F. Schatz Research and Consulting, Inc. 2004.
Cuthill, D.A. et al., "A New Technique for Rapid Estimation of Fracture Closure Stress When Using Propellants," SPE/ISRM 78171, Society of Petroleum Engineers, 2002.
Dobrilovic, Mario et al., "Measurements of Shock Wave Force in Shock Tube with Indirect Methods," Rudarsko-geolosko-naftni zbornik, vol. 17, 2005. University of Zagreb; Zagreb, Croatia.
"Downhole Mechanical Shock Absorber". Preliminary Report—patent and prior art search results, dated Jul. 8, 2010, Starboard Innovations, LLC.
"Ecrin Dynamic Flow Analysis Platform," http://www.essca.com/en/ecrin_en.asp (last visited Oct. 28, 2010) ESSCA, 2009.
"Electronic Initiation System," Special Devices, Inc., http://www.specialdevices.com/mining.htm (last visited May 18, 2011) Mesa, AZ, U.S.A.

\* cited by examiner

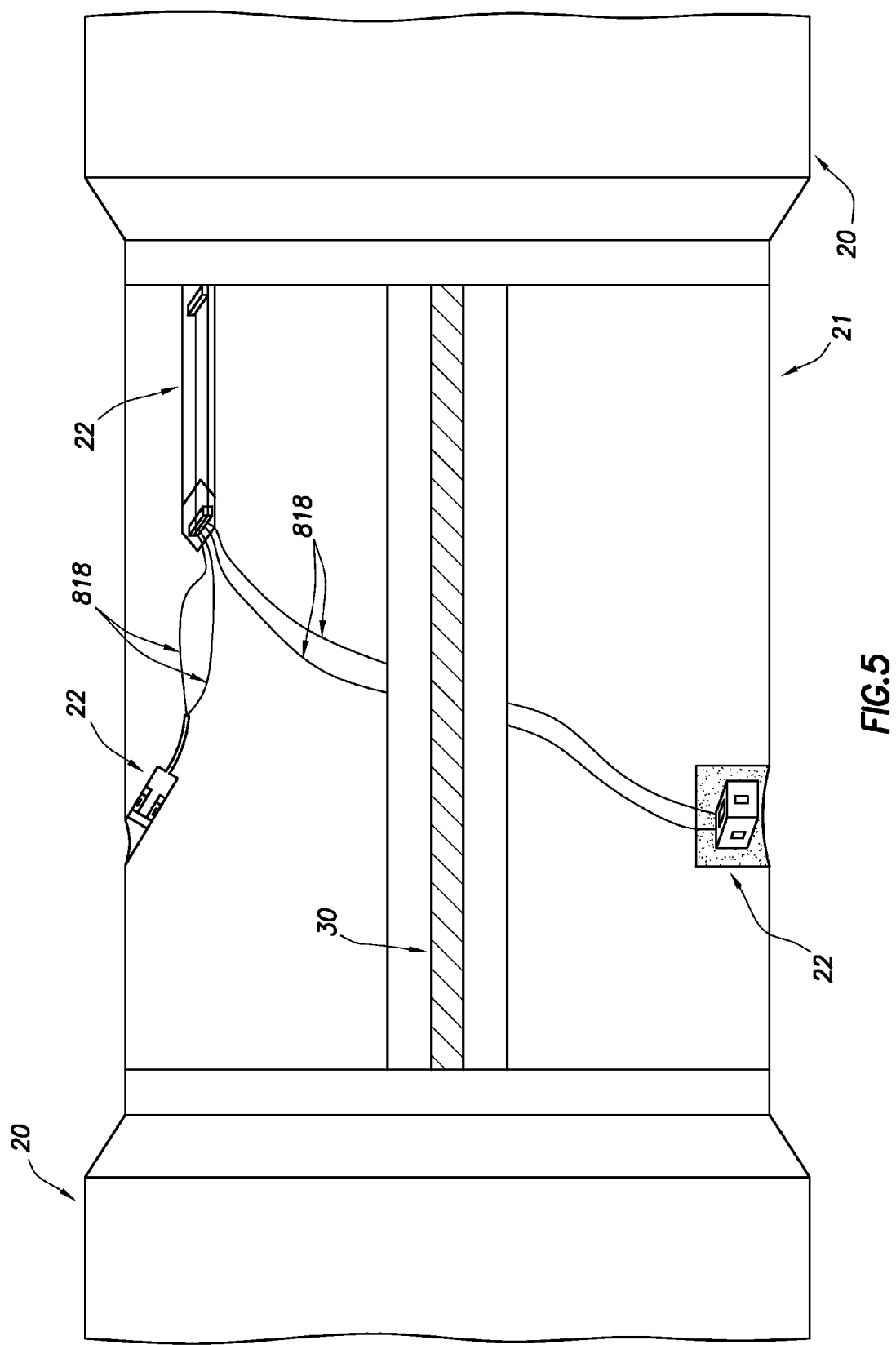

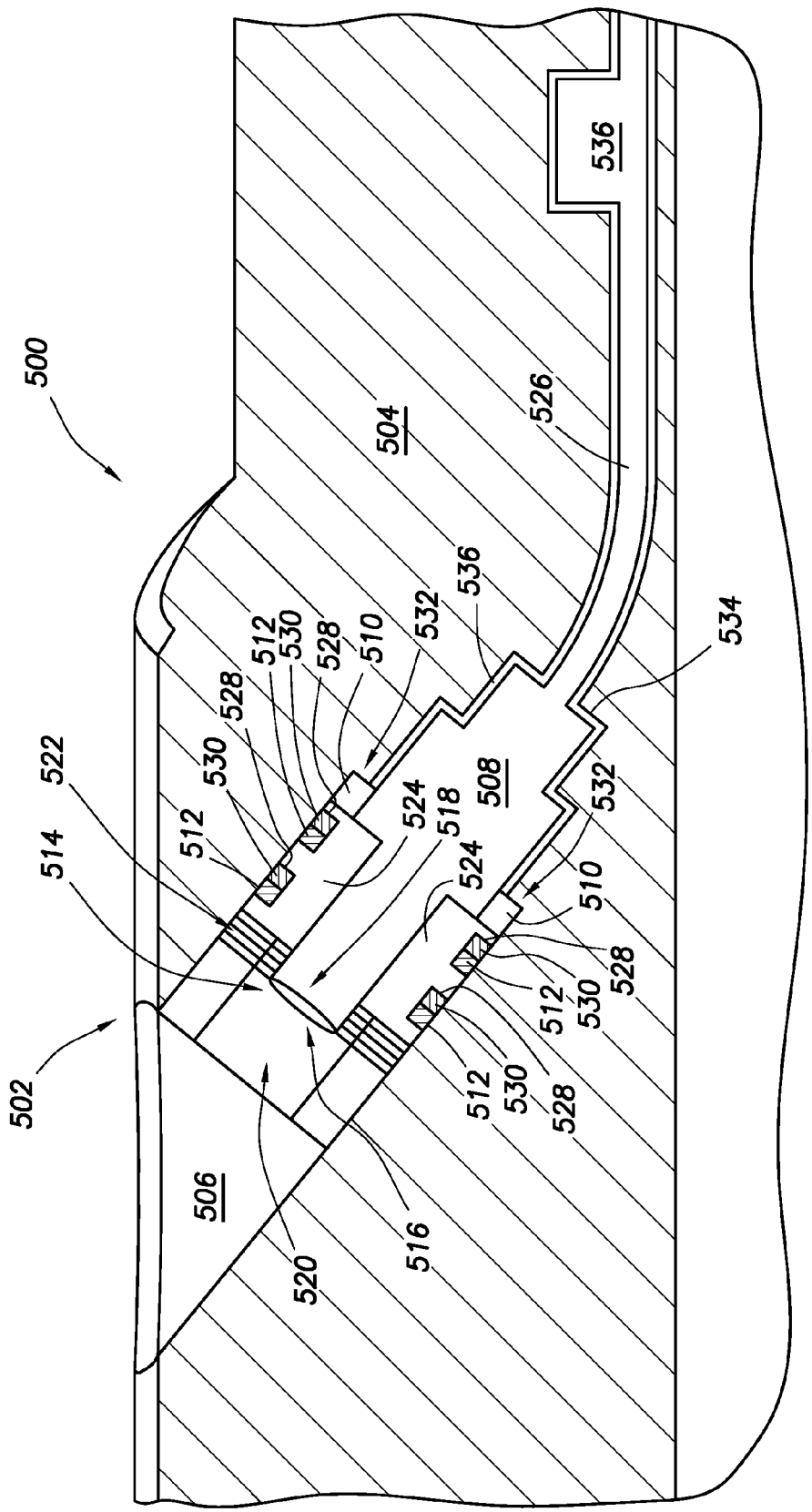

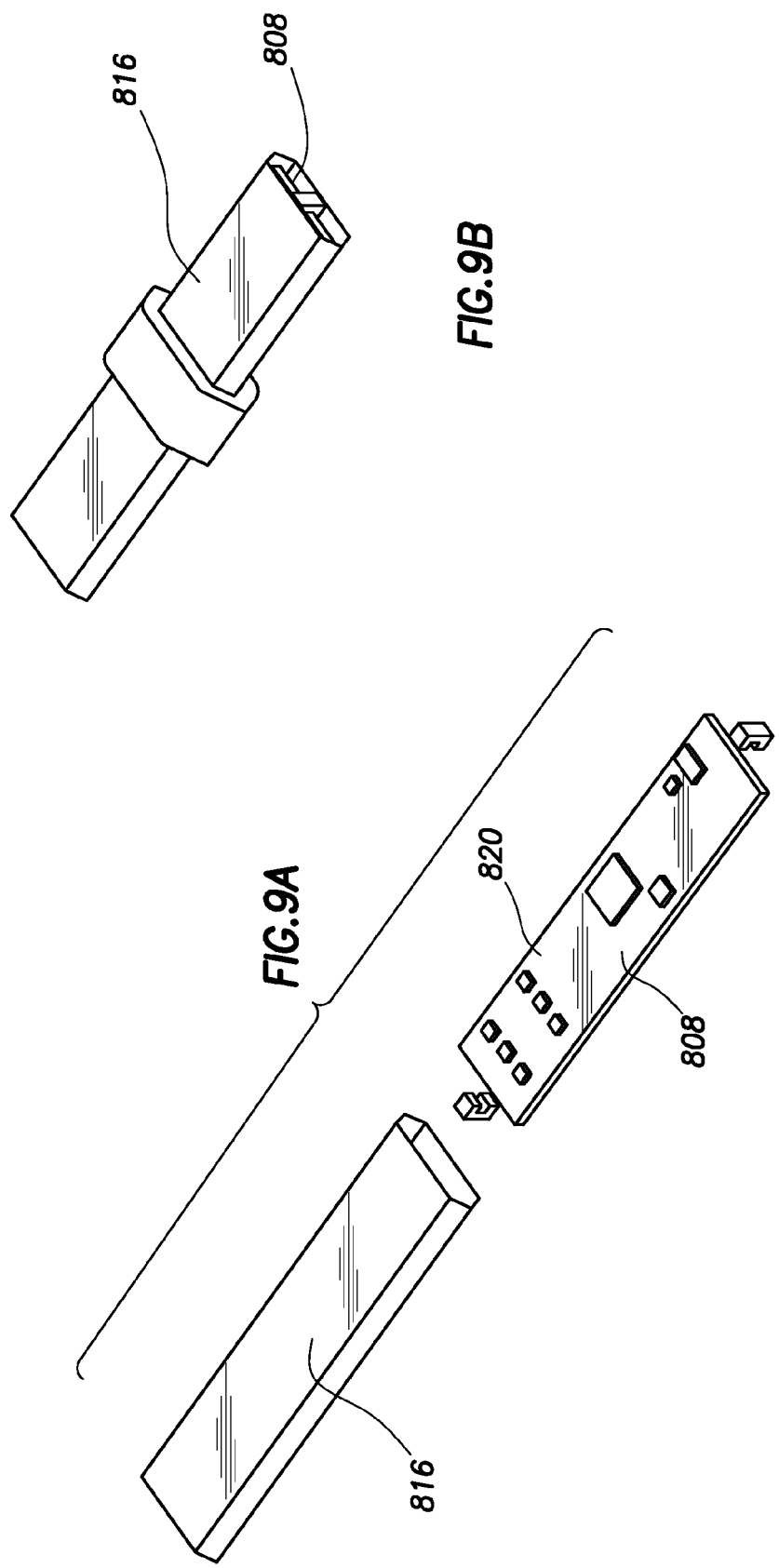

PROTECTION OF ELECTRONIC DEVICES USED WITH PERFORATING GUNS

CROSS-REFERENCE TO RELATED APPLICATIONS

This application is a national stage of and claims priority under 35 U.S.C. §371 to International Patent Application Serial No. PCT/US12/70740, filed on Dec. 19, 2012, entitled "Protection of Electronics Used with Perforating Guns," by Patrick L. Walter, et al., which claims the benefit of and priority under 35 U.S.C. §119 to U.S. Provisional Patent Application Ser. No. 61/732,322, filed on Dec. 1, 2012, entitled "Protection of Electronics used with Perforating Guns," by John P. Rodgers, et al., both of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbons may be produced from wellbores drilled from the surface through a variety of producing and non-producing formations. For example, a casing string may be set and cemented in the wellbore, and/or a liner may be hung in the casing string. The casing string and cement generally form an impervious barrier between the wellbore interior and the surrounding subterranean formation. In order to provide fluid communication through the casing and cement, the casing string may be perforated by firing a perforation gun or perforation tool. Perforation guns generally include an explosive charge such as a shaped explosive charge that detonates to form a jet, which may penetrate the tool, the casing, any cement, and form a perforation tunnel in the subterranean formation. In general multiple perforating charges are used per interval to create a plurality of opening for fluid to pass from the subterranean formation into the wellbore (e.g., production fluids such as oil, water, and/or gas) and/or for fluids to pass from the wellbore to the subterranean formation (e.g., treatment fluids, injection fluids, etc.).

In general, the resulting detonation of the perforating charge(s) may create a high intensity shock wave impacting the perforating tools, and eventually propagating as pressure disturbance through the wellbore. The immediate shock wave and resulting pressure disturbance may result in various forces being applied to the components disposed within the wellbore, which in some cases may result in damage and/or failure of the components.

SUMMARY

In an embodiment, a sensing subassembly for use with a downhole tool comprises a housing, a cavity disposed within the housing, at least one electronic component disposed within the cavity, and at least one isolating member disposed within the cavity. The at least one isolating member is configured to attenuate at least a portion of frequency components of a mechanical wave above a threshold and transmit at least a portion of frequency components below the threshold to the at least one electronic device.

In an embodiment, a method of measuring a shock event in a wellbore comprises receiving, by a sensing subassembly, at least one mechanical wave within a wellbore, where the sensing subassembly comprises: a cavity disposed within a housing, at least electronic component disposed within the cavity, and at least one isolating member disposed with the at least one electronic device within the cavity. The method also comprises attenuating at least a portion of frequency components of the at least one mechanical wave above a threshold frequency, transmitting at least a portion of the frequency components of the at least one mechanical wave below the threshold to the electronic device, sensing at least one parameter associated with the at least one mechanical wave, generating, by the electronic component, at least one signal in response to the sensing, and storing the at least one signal in a non-transitory computer readable media.

In an embodiment, a method of absorbing a mechanical wave using a shock protection apparatus comprises receiving a mechanical wave at a housing. The housing is disposed in a wellbore, and the housing contains at least one cavity with at least one sensor disposed within the at least one cavity. The at least one sensor is coupled to the housing by an isolation member. The method also comprises attenuating at least a portion of the mechanical wave using the isolation member, transmitting at least a portion of the mechanical wave to the at least one sensor using the isolation member, and sensing at least one parameter of the mechanical wave transmitted to the at least one sensor.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description:

FIGS. 2-5 are schematic views of an embodiment of a sensor which may be used in the system and method of FIG. 1.

FIG. 6 is a schematic view of an embodiment of sensor configurations.

FIG. 9A is yet another schematic view of an embodiment of sensor configurations.

FIG. 9B is another schematic view of an embodiment of sensor configurations.

DETAILED DESCRIPTION OF THE EMBODIMENTS

Figure 1:
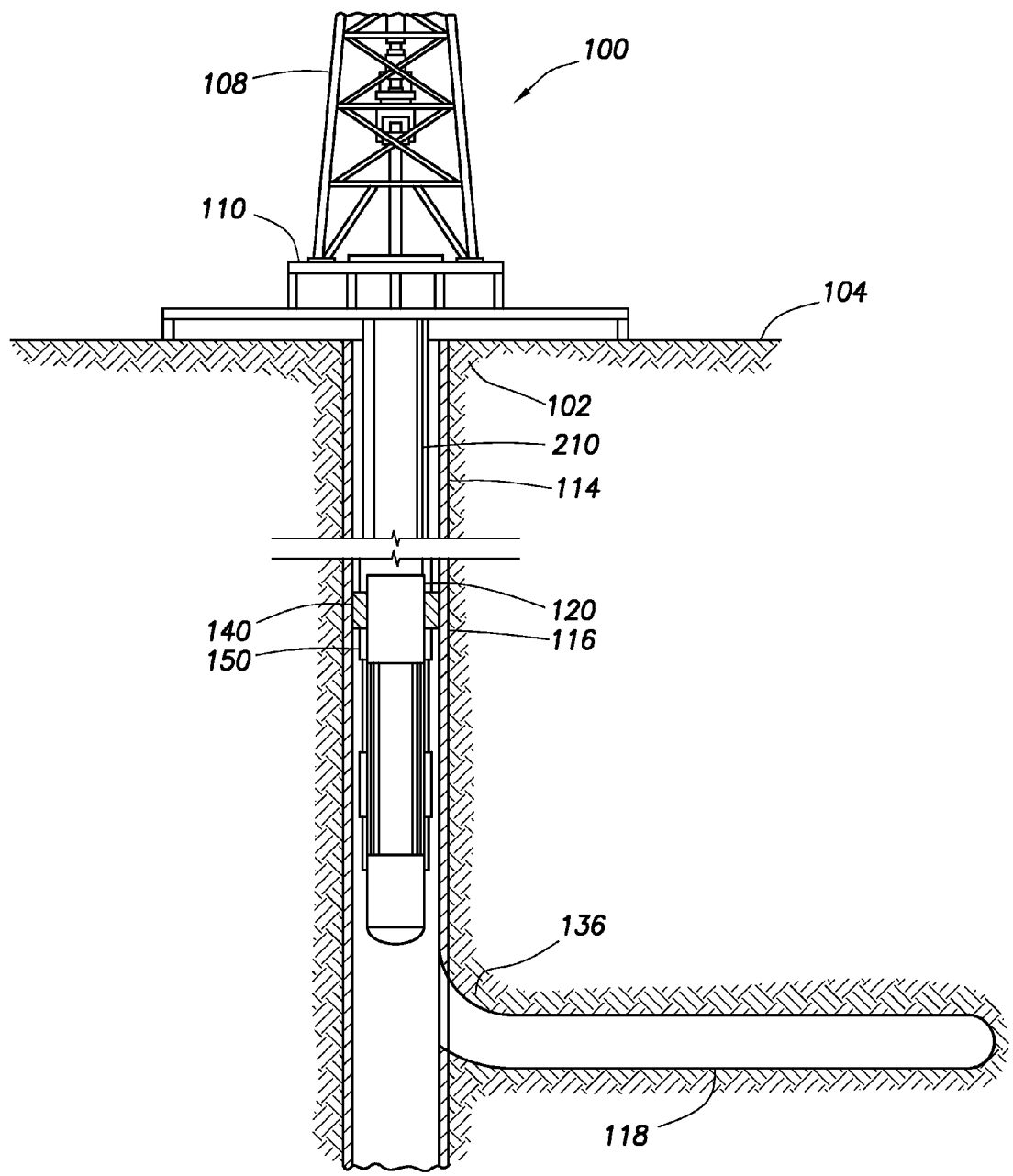
FIG. 1 is a schematic partial cross-sectional view of an embodiment of a well system and associated method which can embody principles of the present disclosure.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed infra may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," or "upward" meaning toward the surface of the wellbore and with "down," "lower," or "downward" meaning toward the terminal end of the well, regardless of the wellbore orientation. Reference to in or out will be made for purposes of description with "in," "inner," or "inward" meaning toward the center or central axis of the wellbore, and with "out," "outer," or "outward" meaning toward the wellbore tubular and/or wall of the wellbore. Reference to "longitudinal," "longitudinally," or "axially" means a direction substantially aligned with the main axis of the wellbore and/or wellbore tubular. Reference to "radial" or "radially" means a direction substantially aligned with a line between the main axis of the wellbore and/or wellbore tubular and the wellbore wall that is substantially normal to the main axis of the wellbore and/or wellbore tubular, though the radial direction does not have to pass through the central axis of the wellbore and/or wellbore tubular. The various characteristics mentioned above, as well as other features and characteristics described in more detail below, will be readily apparent to those skilled in the art with the aid of this disclosure upon reading the following detailed description of the embodiments, and by referring to the accompanying drawings.

The use of a perforating tool or other detonation device within a wellbore may result in a mechanical shock disturbance due to a detonation and/or perforating event. For clarity, a mechanical shock disturbance, a shock wave, and/or a pressure disturbance in the wellbore are collectively referred to as "mechanical waves" herein, wherein "mechanical waves" refer to any wave needing a medium in order to propagate (as opposed to an electromagnetic wave that can propagate in a vacuum). Mechanical waves may propagate as pressure waves in the fluid within a wellbore, and/or as transverse, longitudinal, and/or surface waves in the fluid or components of the wellbore (e.g., the wellbore tubular, the casing, the sensing subassembly housing, etc.). The impact on the perforating tool, the wellbore tubular string coupled to the perforating tool, and various other components within the wellbore (e.g., packers, plugs, etc.) may result in damage to the various components. Models may be used to simulate the results of a perforating event to allow tool strings to be designed that are capable of withstanding the perforating event. In order to calibrate the models, actual perforating event data can be used, which may be collected using sensors at or near the perforating location. For example, pressure sensors, accelerometers, temperature sensors, and the like may be placed within the perforated zone to collect data before, during, and after the detonation of one or more explosive devices. The resulting data may then be used in the development of a model or simulating tool for the design of the perforating tool, wellbore tubular string, and/or other various components impacted by the perforating event.

The sensors used to collect the perforating event data may themselves be subjected to the forces created by the perforating event. It will be appreciated that the sensors should be subjected to some portion of the resulting forces in order to obtain suitable measurements, however, excess exposure to the resulting forces may damage or destroy the sensors and the associated processing and storage equipment. In order to limit or prevent damage to the sensors themselves, a shock protection apparatus may be used to limit or control the impact of the forces resulting from the mechanical waves.

As disclosed herein, the configuration of the shock protection apparatus may vary depending on the type of sensor or other electronic component being protected. Mechanical waves generated by detonation may travel from the guns and a detonating cord housing through the tools. The mechanical waves may reflect off of boundaries resulting in many waves being imparted on sensitive components, with the possibility of constructive interference. Mechanical waves reaching sensitive components may result in acceleration above a threshold level experienced by the components. This acceleration can result in localized stress and deformation in the components that can lead to damage and/or failure. Isolation mounts may serve to filter out frequencies above a threshold from mechanical waves, resulting in accelerations below a threshold on the sensitive components. Stiffeners such as metal strips and/or tubes may engage electronic boards to reduce and/or limit the maximum flexing and/or deformation of the components therein. For example, a metal strip stiffener may engage an electronic board to reduce the flexing of the electronic board. The metal strip may engage at least one edge of the electronic board. In an embodiment, stiffeners such as tubes and/or external stiffening components may also limit flexibility of electronic boards and/or battery housings. For example, when an electronic board is potted inside a tube, a stiff potting material (e.g. an epoxy) may surround at least a portion of the electronic board within the tube and limit deflection of the electronic board. Bending a circuit board can stress the solder joints holding the components causing them to fail. Direct acceleration of the board will also result in inertial loads as the individual components resist that motion. The inertial loads can also damage the solder joints. Direct acceleration of the components can also result in internal damage to the electronic components. Similarly, acceleration and deformation of battery cells can result in leakage and internal damage that can degrade performance. Sensitive components within pressure transducers or accelerometers, such as MEMS silicon components, can also be damaged by high frequency acceleration above a threshold.

For some sensors, such as dynamic pressure transducers, a shock protection apparatus may include a shock mitigating member disposed between at least one end of the sensor and a housing of a sensing subassembly, where the shock mitigating member is configured to reduce transmission of a mechanical wave between the housing and the sensor. The shock protection apparatus may also comprise at least one seal member disposed between the sensor and the housing. The shock protection apparatus may protect a sensor from mechanical waves by attenuating some of the mechanical waves before the mechanical waves reach the sensor as well as by reflecting some of the mechanical waves away from the sensor, all while permitting the sensor to be in fluid communication with an exterior of the housing.

For some electronic devices, such as electronic boards and batteries, a shock protection apparatus may include a stiffening member engaging an electronic board, wherein the stiffening member is configured to limit at least high frequency mechanical waves communicated to the electronic board and/or transform at least some of the high frequency mechanical waves into lower frequency motion or waves, thereby reducing the forces on the electronic board in the axial and radial directions along the subassembly. The shock protection apparatus may also include a spring structure coupled to at least a portion of the electronic board and configured to limit deflection of the electronic board in the axial and radial directions along the axis of the subassembly. The spring structure may couple the electronic board with at least one cavity wall in the housing. This shock protection apparatus resists moments created across an electronic device from a mechanical wave so that, for example, solder joints on an electronic board are not broken during the detonation of a perforating gun. Furthermore, this shock protection apparatus may resist axial and radially deflection resulting from a mechanical wave produced by the detonation of a perforating gun.

For some sensors, such as accelerometers, a shock protection apparatus for use with a downhole tool may include at least one isolating member disposed within a cavity in a housing of a sensing subassembly. The at least one isolating member may be configured to attenuate (e.g., absorb and/or reflect) and/or convert at least a portion of frequency components of a mechanical wave above a threshold and transmit at least a portion of frequency components below the threshold to the sensor. This shock protection apparatus may also be configured to attenuate at least a portion of the frequency components of a mechanical wave above a threshold produced by the detonation of perforating gun in at least one coordinate axis, while at the same time transmit at least a portion of the frequency components below the threshold to the sensor. This may allow the sensor to obtain an accurate reading of a desired frequency range while limiting interference from unwanted frequency components that would potentially damage the sensor and hinder accurate sensor readings.

Referring to FIG. 1, an example of a wellbore operating environment is shown. As depicted, the operating environment comprises a drilling rig 100 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. The wellbore 114 extends substantially vertically away from the earth's surface 104 over a vertical wellbore portion 116, deviates from vertical relative to the earth's surface 104 over a deviated wellbore portion 136, and transitions to a horizontal wellbore portion 118. In alternative operating environments, all or portions of a wellbore may be vertical, deviated at any suitable angle, horizontal, and/or curved. The wellbore may be a new wellbore, an existing wellbore, a straight wellbore, an extended reach wellbore, a sidetracked wellbore, a multilateral wellbore, and other types of wellbores for drilling and completing one or more production zones. Further, the wellbore may be used for both producing wells and injection wells. In an embodiment, the wellbore may be used for purposes other than or in addition to hydrocarbon production, such as uses related to geothermal energy.

A wellbore tubular string 120 comprising a shock protection apparatus 150 may be lowered into the subterranean formation 102 for a variety of workover or treatment procedures throughout the life of the wellbore. The embodiment shown in FIG. 1 illustrates the wellbore tubular 120 in the form of a workover string being lowered into the subterranean formation. It should be understood that the wellbore tubular 120 comprising a shock protection apparatus 150 is equally applicable to any type of wellbore tubular being inserted into a wellbore, including as non-limiting examples drill pipe, production tubing, rod strings, and coiled tubing. In the embodiment shown in FIG. 1, the wellbore tubular 120 comprising the shock protection apparatus 150 can be conveyed into the subterranean formation 102 in a conventional manner.

The drilling rig 106 comprises a derrick 108 with a rig floor 110 through which the wellbore tubular 120 extends downward from the drilling rig 106 into the wellbore 114. The drilling rig 106 comprises a motor driven winch and other associated equipment for extending the wellbore tubular 120 into the wellbore 114 to position the wellbore tubular 120 at a selected depth. While the operating environment depicted in FIG. 1 refers to a stationary drilling rig 106 for lowering and setting the wellbore tubular 120 comprising the shock protection apparatus 150 within a land-based wellbore 114, in alternative embodiments, mobile workover rigs, wellbore servicing units (such as coiled tubing units), and the like may be used to lower the wellbore tubular 120 comprising the shock protection apparatus 150 into a wellbore. It should be understood that a wellbore tubular 120 comprising the shock protection apparatus 150 may alternatively be used in other operational environments, such as within an offshore wellbore operational environment.

In alternative operating environments, a vertical, deviated, or horizontal wellbore portion may be cased and cemented and/or portions of the wellbore may be uncased. For example, uncased section 140 may comprise a section of the wellbore 114 ready for being cased with wellbore tubular 120. In an embodiment, a shock protection apparatus 150 may be used on production tubing in a cased or uncased wellbore.

Figure 2:
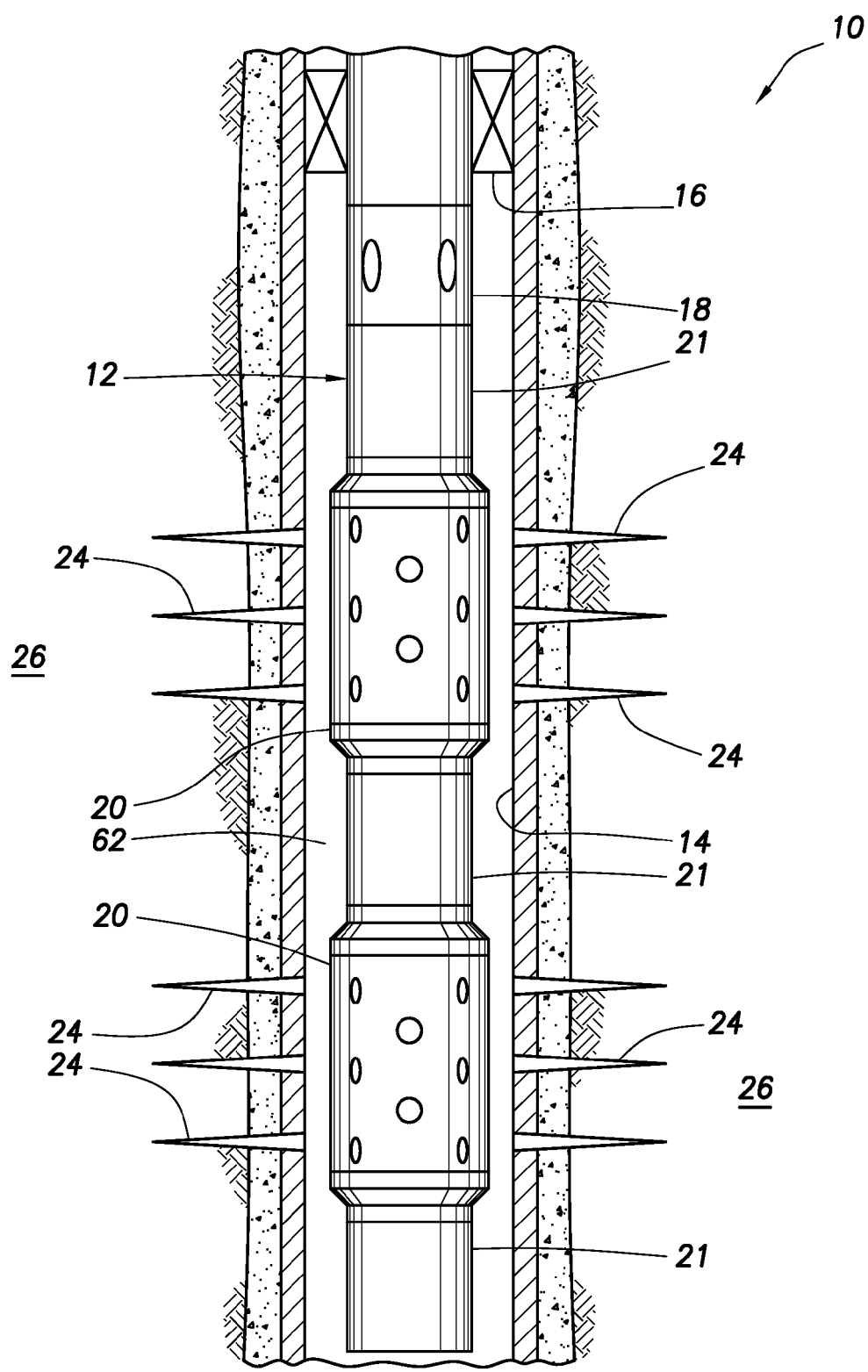

Representatively illustrated in FIG. 2 is a well system 10 which can embody principles of the present disclosure. In the well system 10, a perforating string 12 is installed in a wellbore 14. The depicted perforating string 12 includes a packer 16, a firing head 18, perforating guns 20, and a sensing subassembly 21. In other examples, the perforating string 12 may include more or less of these components. For example, well screens and/or gravel packing equipment may be provided, any number (including one) of the perforating guns 20 and sensing subassemblies 21 may be provided, etc. Thus, it should be clearly understood that the well system 10 as depicted in FIG. 2 is merely one example of a wide variety of possible well systems which can embody the principles of this disclosure.

One advantage of interconnecting the sensing subassembly 21 in close proximity to the perforating guns 20 may be to allow for more accurate and reliable measurements of the parameters (e.g., strain, acceleration, pressures, temperatures, etc.) associated with a perforating event. The sensors within a sensing subassembly 21 may also be used to detect and measure conditions in the wellbore 14 in close proximity to perforations 24 immediately after the perforations are formed, thereby facilitating more accurate and reliable analysis of characteristics of an earth formation 26 penetrated by the perforations.

A sensing subassembly 21 comprising a shock protection apparatus 22 can be disposed above the perforating guns 20, between two perforating guns 20, and/or below the perforation guns 20. Regardless of the type of environment the sensing subassembly 21 is used, it will be appreciated that a shock protection apparatus disposed within the sensing subassembly 21 serves to protect an electronic device such as a sensor and/or electronics board from damage, for example due to a mechanical wave generated during a perforating event. The sensing subassembly 21 comprising a shock protection apparatus 22 may be interconnected above an upper perforating gun 20 to more accurately and reliably record the forces and parameters resulting from a perforating event on the perforating string 12 above the perforating guns. The information obtained from the sensors may be used to design the various components of the system to limit and/or prevent unsetting or other damage to the packer 16, firing head 18, etc., due to detonation of the perforating guns 20. In an embodiment, a sensing subassembly 21 interconnected between perforating guns 20 may be used to detect the effects of perforating on the perforating guns 20 themselves. In some embodiments, a sensing subassembly 21 may be connected below the lowest perforating gun 20 to more detect and record the effects of perforating on any component located below the perforating train. In some embodiments, the perforating string 12 could be stabbed into a lower completion string, connected to a bridge plug or packer at the lower end of the perforating string, etc., in which case the information recorded by a sensing assembly 21 may be used to detect the forces acting on the various components below the perforating guns 20.

Viewed as an overall system, a perforating string 12 comprising a sensing subassembly 21, which in turn may comprise a shock protection apparatus 22, may allow for the acquisition of data at various points between or near one or more perforating guns, which may be useful in developing and/or validating a model of the system. Thus, reliably and accurately collecting data above, between and/or below the perforating guns 20, for example, can help in an understanding of the overall perforating event and its effects on the system as a whole. The sensing assembly 21 comprising a shock protection apparatus 22 may more accurately and reliably obtain information not only useful for future designs, but for current designs, for example, in post-job analysis, formation testing, etc. The applications for the information obtained by the sensing assembly 21 are not limited at all to the specific examples described herein.

While described in terms of a sensing subassembly disposed in a perforating string, the sensing subassembly and shock protection apparatus described herein may also be used with any number of other tools, such as drilling, completion, production, and/or workover tools. In an embodiment, the sensing subassembly may be disposed in a wellbore tubular string, or the sensing subassembly may comprise a separate component that is coupled or engaged to a wellbore tool (e.g., affixed to using any suitable connection mechanism) to measure one or more parameters. For example, the sensing subassembly may be coupled to an outside of a wellbore tubular tool or string, and/or the sensing subassembly may be disposed in a recess or cavity on a wellbore tubular string or tool.

In general, the shock protection apparatus 22 may be used to passively isolate one or more sensors within the sensing subassembly 21 using one or more of a variety of techniques. For example, the shock protection apparatus may comprise a sensor acting as a mass that may be coupled within the sensing subassembly using a spring and damping elements, which may be the same component. The sensor coupled in the sensing subassembly by the spring and damping elements can be thought of as moving as a harmonic oscillator. The characteristics of the mass and the spring stiffness can be used to determine a natural frequency of the system. Damping may dissipate energy in the system, which may reduce the vibration level which is transmitted at the natural frequency. The characteristics of the damping element cause energy dissipation during the oscillation and have a secondary effect on the natural frequency. The shock protection apparatus may provide isolation for the sensor from mechanical waves in both directions, isolating the sensor from vibrations traveling from the sensing subassembly, and also isolating the sensing subassembly from vibrations originating in the sensor. Moreover, the shock protection apparatus may provide isolation for the sensor from mechanical waves traveling in a plurality of directions and originating from a variety of sources.

When vibration is applied (e.g., due to a mechanical wave), energy can be transferred more efficiently at the natural frequency as compared to above or below the natural frequency. The efficiency and extent of the isolation a given situation may depend on a variety of factors including, but not limited to, the frequency, direction, and magnitude of vibrations present, the desired level of attenuation of those frequencies, and the characteristics of the components of the damping system (e.g., the mass or sensor, the spring, and/or the damping elements). As described in more detail herein, the shock protection apparatus may be used to allow relative movement between the sensor and the surrounding sensing subassembly in response to a mechanical wave. Due to the presence of the spring element and the damping element, the relative movement or motion is not free motion, but rather serves to isolate the sensor from the mechanical wave to at least some degree.

Figure 3:
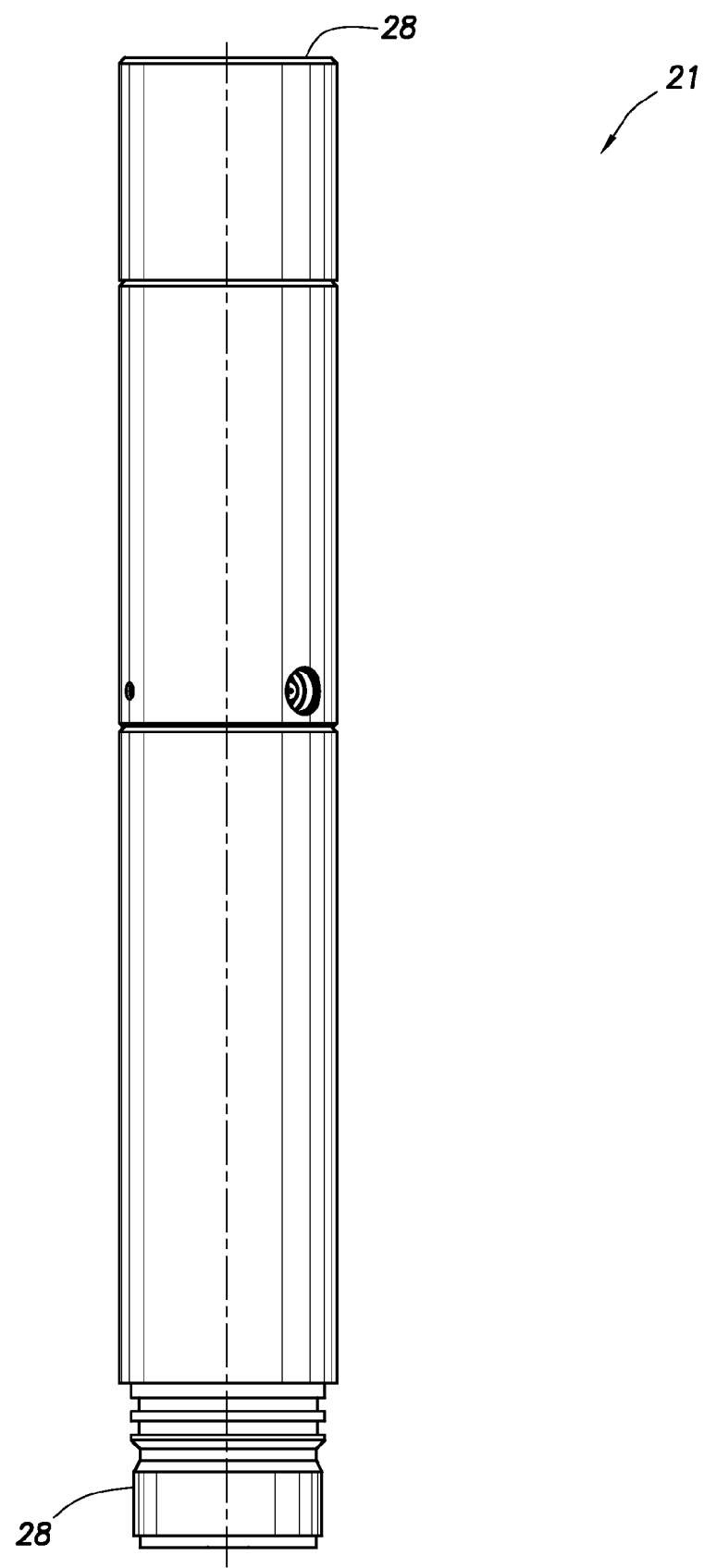

The properties of the shock protection apparatus may also be configured to reduce the transmission of the mechanical wave, and may for example reduce the mechanical wave above a threshold. The threshold may represent an amplitude or a frequency threshold. For example, the properties of the shock protection apparatus may be selected to allow certain mechanical wave frequency ranges to be transmitted to the sensor while at least partially isolating mechanical wave frequency ranges above a threshold. Isolation based on a threshold may be used to reducing the transmission of potentially harmful mechanical wave amplitudes or frequencies while allowing amplitude or frequency ranges of interest to be transmitted to the sensor for detection Referring additionally now to FIGS. 2-4, one example of as sensing subassembly 21 comprising a shock protection apparatus 22 is representatively illustrated. As depicted in FIG. 3, the sensing subassembly 21 is provided with mechanical end connectors 28 for interconnecting the tool in the perforating string 12 in the well system 10. The end connectors 28 may include both mechanical connections such as threads for coupling the sensing subassembly with an adjacent tubular component as well as one or more fluid and/or electrical connections for allowing a signal (e.g., an electrical signal, control signal, etc.) to be transmitted through the sensing subassembly 21. In addition, other types of connectors may be used, and the shock protection apparatus 22 may be used in other perforating strings and in other well systems, in keeping with the principles of this disclosure.

Figure 4:
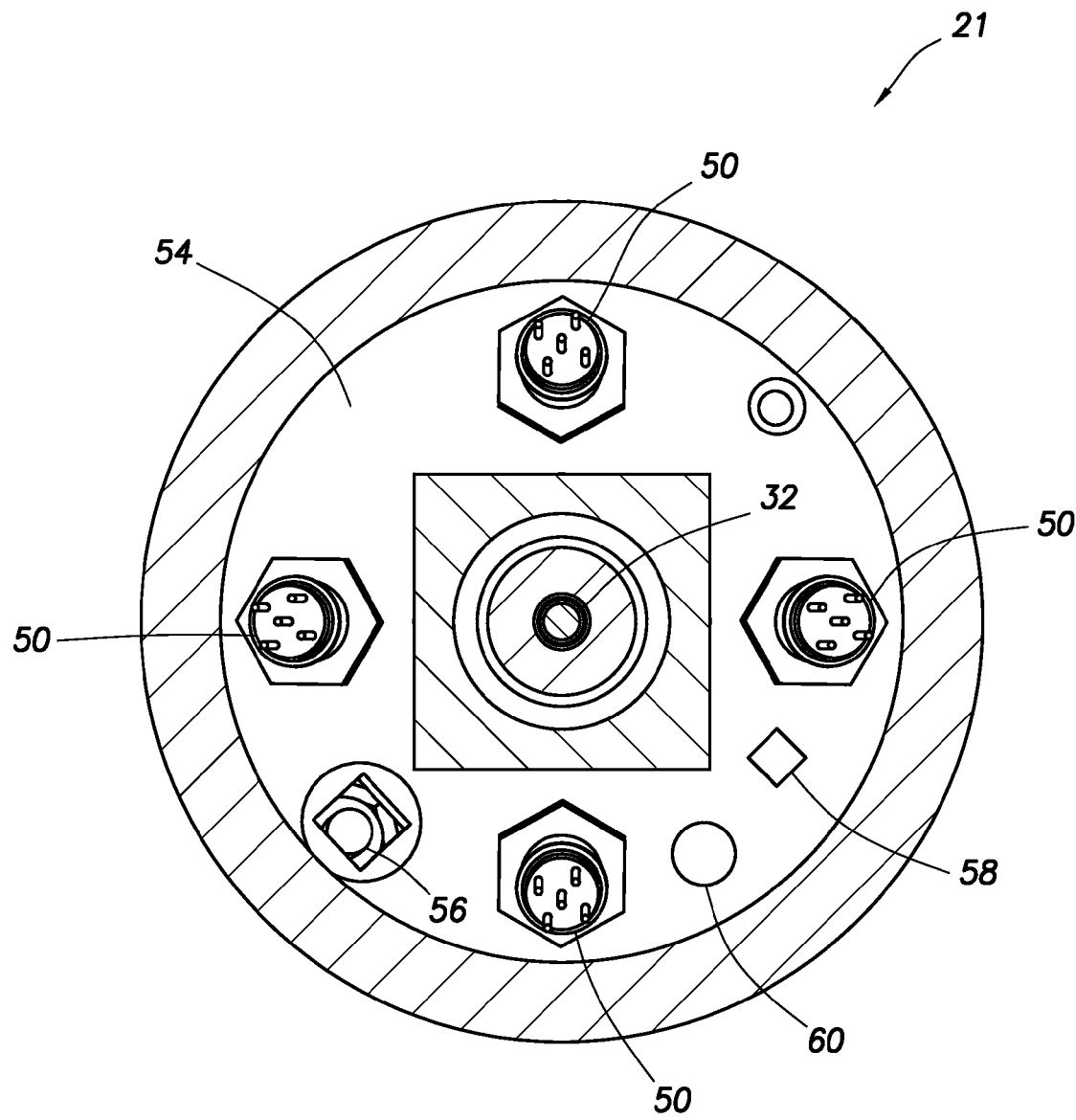

In FIG. 4, it may be seen that four of the electrical connectors 50 are installed in a bulkhead 54 at one end of the sensing subassembly 21. While four electrical connectors 50 are shown, less than four or more than four may be included as desired, and each electrical connector 50 may comprise one or more electrical connections (e.g., pins, receivers, etc.). In an embodiment, a pressure sensor 56, a temperature sensor 58, and/or an accelerometer 60 can be mounted to the bulkhead 54. The pressure sensor 56 can be used to monitor pressure external to the sensing subassembly 21, for example, in an annulus 62 formed radially between the perforating string 12 and the wellbore 14 (see, for example, FIG. 2). The pressure sensor 56 may comprise any pressure sensor suitable for use in a wellbore environment that is capable of measuring the pressure within the sensing subassembly 21 and/or the wellbore. The pressure sensor 56 may be configured to measure the static and/or dynamic pressure. A suitable pressure sensor 56 may include, but is not limited to, Kulite model HKM-15-500 pressure transducer (available from Kulite Semiconductor Products, Inc. of Leonia, N.J.). The temperature sensor 58 may be used for monitoring temperature within the tool 22 and/or the wellbore. The accelerometer 60 may be used to measure the various movements and/or forces applied to the sensing subassembly 21. In an embodiment, the accelerometer 60 may comprise a piezoresistive type accelerometer, although other types of accelerometers may be used, if desired. Suitable accelerometers may include, but are not limited to, a PCB 3501A series accelerometer (available from PCB of Depew, N.Y.), which is available in single axis or triaxial packages and is capable of sensing up to 60,000 g acceleration.

In FIG. 5, a cross-sectional view of a sensing subassembly 21 with a pressure transducer, electronic board, and an accelerometer is schematically illustrated. One or more electrical couplings (e.g., electrical wires 818) may be used to electrically couple one or more of the components of the sensing subassembly 22. In this view, it may be seen that the sensing subassembly 21 may include a detonation train 30 extending through the interior of the tool. The detonation train 30 can transfer detonation between perforating guns 20, between a firing head (not shown) and a perforating gun, and/or between any other explosive components in the perforating string 12. In the example of FIGS. 2-4, the detonation train 30 may include a detonating cord 32 and explosive boosters 34, but other components may be used, if desired.

In an embodiment as shown in FIG. 6, a shock protection apparatus may be used to protect a sensor 508 exposed to the exterior of the sensing subassembly 21. The shock protection apparatus 502 for use in a downhole tool may be disposed in a sensing subassembly 500. The sensing subassembly 500 generally comprises a housing 504 having a cavity 506 extending into the housing 504. The sensing subassembly 500 may comprise a sensor 508 disposed at least partially within the cavity 506, where at least a portion of the sensor 508 may be in fluid communication with an exterior of the housing 504. A mounting ring 524 may be disposed about a portion of the sensor 508 and serve to centralize the sensor 508 within the cavity 506 during use. A retaining ring 520 may be disposed between the sensor 508 and the exterior to the housing 504. The retaining ring 520 may engage the interior of the cavity 506 and serve to retain the mounting ring 524, and thereby the sensor 508, within the cavity 506 during use. A port may be disposed within the housing 504 to allow for one or more couplings from the sensor to pass through the housing 504 to another component within the sensing subassembly 21 such as an electronics board.

A shock protection apparatus 502 may be disposed between the sensor 508 and the housing 504. The shock protection apparatus 502 comprises a shock mitigating member 510 disposed between at least one end of the sensor 508 and the housing 504. The shock mitigating member 510 may be configured to reduce transmission and/or attenuate at least a portion of a mechanical wave traveling between the housing 504 and sensor 508. The shock protection apparatus 500 may also include at least one seal 512 disposed about the sensor 508 and between the sensor 508 and the housing 504. In some embodiments, a seal may be disposed between the sensor 508 and the mounting ring 524. In an embodiment, the seal 512 disposed between the sensor 508 and the mounting ring 524 may comprise a metal crush ring and/or a dual o-ring geometry. In an embodiment, the sensor 508 comprises a pressure sensor, such as a static and/or dynamic pressure sensor. In an embodiment, suitable pressure sensors may include the Kulite HKM series for measuring both static and dynamic pressures and the PCB 119B for measuring dynamic pressures. In some embodiments, various additional sensors such as strain gauges may also be used to measure pressure (e.g., static pressure). In an embodiment, the sensor 508 may comprise a pressure sensor, a temperature sensor, a logging sensor, and/or an optical sensor. In an embodiment the sensor 508 may comprise any sensor used by one of ordinary skill in the art.

In an embodiment, the sensor 508 may be disposed in the sensing subassembly 500 so that at least a portion of the sensor 508 may be in fluid communication with an exterior of the housing 504. For example, the sensor 508 may be disposed so that a sensing face 514 is in fluid communication with an exterior of the housing 504. When the sensor 508 is disposed so that sensing face 514 is in fluid communication with an exterior of the housing, the sensor 508 may detect changes in pressure caused by a pressure wave moving along the wellbore. For example, the sensor may measure a dynamic pressure from a pressure wave resulting from the detonation of a perforating gun. In another embodiment, the sensor 508 may detect static pressure at the exterior of the housing 504.

In an embodiment, the sensor 508 may be positioned within the housing 504 close to the outer surface of the housing 504 so that any cavity resonance is minimized. In this embodiment, the longitudinal axis of the sensor 508 may be oriented about ninety degrees from the wellbore tubular longitudinal axis (e.g., the sensor axis may be oriented perpendicular to the longitudinal axis of the wellbore tubular) so that any cavity resonance is minimized while allowing a pressure signal to be detected and measured. In an embodiment, when the sensor 508 is oriented at about ninety degrees from the wellbore tubular axis, the electrical connections (e.g., the wires) may be disposed substantially parallel with the wellbore tubular axis through the housing 504.

In some embodiments, the sensor 508 may have a length that prevents it from being oriented at about ninety degrees from the wellbore tubular axis. In this case, the sensor 508 may need to be disposed at an angle less than ninety degrees relative to the wellbore tubular axis while still allow the sensor 508 to have a sensor face close to the exterior of the housing 504. The sensor 508 may be at least partially disposed in a flow path that provides fluid communication through the housing 504 between the sensor 508 and the exterior of the housing 504. The flow path may comprise a bore that is disposed at an angle between about zero degrees and about 90 degrees with the wellbore tubular axis. The flow path may comprise one or more legs to provide the appropriate spacing for the sensor and/or any communication components (e.g., electrical connections, wires, etc.). One of ordinary skill in the art will appreciate that a plurality of sensor types may be disposed in the housing. Additionally, one of ordinary skill in the art will appreciate that when a sensor, such a static pressure transducer, is recessed in the housing 504 and a flow path provides fluid communication between the exterior of the housing 540 and the sensor 508, the sensor 508 may sense a parameter, such as static pressure, at the exterior of the housing via the flow path. In an embodiment, the sensor 508 may be recessed within the housing 504 away from the outer surface of the sensing subassembly 500, for example, to protect the sensor 508 and/or so that sensor 508 can be positioned in close proximity to supporting electronics.

The sensor may also detect the dynamic and/or static pressure within a portion of the housing (e.g., in an internal flowbore, etc.). In an embodiment, the flow path may be configured to provide fluid communication between a sensor 508 and an internal fluid pathway within the wellbore tubular. For example, a detonation cord housing may not be loaded with a detonation cord so that an internal fluid pathway may communicate through the detonation cord housing for a variety of well completion operations. Fluid communication may be established between the detonation cord housing and the sensor to sense one or more parameters, such as pressure, temperature, flow rate, etc., within the interior of the housing.

In an embodiment, a screen 516, can optionally be disposed over at least a portion of the sensor 508 between the sensor 508 and the exterior of the housing 504. As shown in FIG. 6, the screen 516 may be disposed over at least a portion of the sensing face 514. In an embodiment, the screen 516 is configured to protect the sensing face 514 from debris that may be present in the wellbore. When the screen 516 is disposed on at least a portion of the sensing face 514, the screen 516 may protect the sensing face 514 from damaging contact from debris when impacted by a mechanical wave.

In an embodiment, an optional coating composition 518, may be disposed over at least a portion of the sensor 508. The coating composition 518 may be disposed on at least a portion of the sensing face 514. When a screen 516 is present, the coating composition 518 may be disposed between the sensing face 514 and the screen 516 and/or on the outside of the screen 516. In an embodiment, the coating composition 518 may thermally insulate the sensor 508 from the exterior of the housing 504. When the coating composition 518 is disposed on at least a portion of the sensing face 514, the coating composition 518 may thermally insulate the sensor face 514 from the heat generated by the detonation of a perforating gun.

In an embodiment, an electrical insulator may be disposed between the sensor 508 and the housing 504 and/or the mounting ring 504. An electrical insulator may also be disposed between the mounting ring 524 and the housing 504. The electrical insulator may be configured to manage electrical noise during a wellbore operating procedure. For example, when a perforating gun is detonated within a wellbore, the sensor 508 may sense, for example, a pressure change, within the wellbore. As the sensor 508 converts the pressure signal into an electrical signal and sends the electrical signal to supporting electrical components, the signal may be distorted due to contact with electrically conductive components surrounding the sensor 508 creating unwanted electrical noise. Disposing an electrical insulator between the sensor 508 and other components of the shock protection apparatus 500 may mitigate electrical noise interfering with sensor signals.

The retaining ring 520 may be disposed between the sensor 508 and the exterior of the housing 504. In an embodiment, the retaining ring 520 may be pinned to and/or threadedly engaged with the wall of the cavity 506 and/or the housing 504. When the retaining ring 520 is disposed between the sensor 508 and the exterior of the housing 504, the retaining ring 520 may be configured to provide a compression force on the shock isolation member 510. For example, the retaining ring 520 disposed between the sensor 508 and the exterior to the housing 504 may provide a compression force on the mounting ring 524, which may in turn provide a compression force on the shock isolation member 510, before the sensing assembly 500 is disposed in a wellbore. The retaining ring 520 may also prevent the sensor 508 from displacing out of the cavity 506 of the housing 504 during the detonation of a perforating gun.

In an embodiment, at least one washer 522 may be disposed between the retaining ring 520 and the mounting ring 524 and/or the sensor 508. In an embodiment, the washer 522 may be configured to attenuate a portion of the pressure wave above a threshold isolation frequency. In an embodiment, the washer may comprise an elastomeric washer. In an embodiment, the washer 522 may support and isolate the sensor 508 along the axis of the sensor 508 from deflections caused by the detonation of a perforating gun. The washer 522 may comprise a relatively softer material (e.g., softer than the material of other members such as the retaining ring 520, the mounting ring 524, and/or the housing 504). The relatively softer material of the washer(s) 522 may provide more shock isolation. The softer material of the washer(s) 522 may also provide compliance for torqueing the retaining member 520 when pre-loading the sensing subassembly 500. In an embodiment, the effective axial and shear stiffness of the washer 522 can be tuned to achieve a desirable isolation frequency for shock protection. As an alternative to a washer and/or an elastomeric washer, the washer 522 may comprise a wave spring and/or a Belleville type spring. To that effect, a wave spring and/or a Belleville type spring may be used in conjunction with a washer and/or an elastomeric washer.

In an embodiment, an additional washer similar to the washer 522 may be disposed between the mounting ring 524 and the shock mitigating member 510. The washer may comprise an elastomeric washer. The washer may be configured so that at least a portion of the sensor 508 is in fluid communication with an exterior of the housing 504 and the washer 522 can provide support and isolation for the sensor 508 along the axis of the sensor 508. In an embodiment, the washer may provide radial support and isolation for the sensor 508 about the axis of the sensor 508. For example, the washer may abut the sensor 508 to provide shear support and/or radial isolation for the sensor 508. The washer may be subject to hydrostatic loads and may have a sufficiently high compressive strength to avoid deflection and/or damage to the sensor 508 and the mounting ring 524.

The mounting ring 524 may be disposed about the axis of the sensor 508 between the shock mitigating member 510 and the washer 522. In an embodiment, the mounting ring 524 may be configured so that at least a portion of the sensor 508 is in fluid communication with an exterior of the housing 504. The mounting ring 524 may provide support and isolation for the sensor 508 along the axis of the sensor 508 and/or radially about the axis of the sensor 508. In an embodiment, the mounting ring 524 may be coupled to the sensor 508 for added leak protection (e.g., welded to the sensor, integrally formed with the sensor, etc.). The mounting ring 524 may also be configured so that at least one seal member 512, at least one seal back up 530, a washer 522, and/or a reflection member 510 may prevent the mounting ring 524 from engaging the cavity wall. When the mounting ring 524 is isolated from the cavity wall and the interfacing components are electrically insulating, substantial electrical isolation may be achieved for electromagnetic signal transmission through the sensor 508.

One or more seal member housings 528 may be circumferentially disposed about the mounting ring 524 and/or the sensor 508. In an embodiment, at least one seal member housing 528 may be configured to support at least one seal member 512. The at least one seal member housing 528 may comprise a groove disposed on the outside diameter of the mounting ring 524 and/or the sensor 508. In an embodiment, a first and a second seal member housing 528 may be circumferentially disposed about the mounting ring 524 and/or sensor 508. In an embodiment, the at least one seal member housing 528 may be configured to support at least one seal member 512 and/or at least one seal back up member 530.

At least one seal member 512 may be disposed in the seal member housing 528 between the sensor 508 and the housing 504. In an embodiment, at least one seal back up member 530 may be disposed adjacent to the at least one seal member 512 within the at least one seal member housing 528. The at least one seal member 512 and/or the at least one seal back up member 530 may sealingly engage the housing 504 and seal at least a portion of the sensor 508 as well as the wire 526 to prevent fluid communication with the exterior of the housing 504. In an embodiment, the at least one seal member 512 and/or the at least one seal back up member 530 may serve to isolate at least a portion of a mechanical wave traveling between the mounting ring 524 and the housing 504. In an embodiment, the at least one seal member 512 and the at least one seal back up member 530 may serve to isolate at least a portion of a compression wave function traveling along the axis of the sensor 508. In an embodiment, when at least one seal member 512 is disposed about the axis of the sensor 508 between the sensor 508 and the housing 504, the at least one seal member 512 may contact the housing 504 and may serve to isolate at least a portion of a compression wave traveling between the mounting ring 524 and/or the sensor 508 and the housing 504.

The at least one seal member 512 and/or the at least one seal back up member 530 may be subject to hydrostatic loads. In an embodiment, the at least one seal member 512 and/or the at least one seal back up member 530 may comprise suitable elastomeric compounds which may include, but are not limited to, ethylene propylene diene monomer (EPDM), fluoroelastomers (FKM) [Viton®], perfluoroelastomers (FFKM) [Kalrez®, Chemraz®, Zalak®], flouoropolymer elastomers [Viton®], polytetrafluoroethylene, copolymer of tetrafluoroethylene and propylene (FEPM) [Aflas®], and polyetheretherketone (PEEK), polyetherketone (PEK), polyamide-imide (PAI), polyimide [Vespel®], polyphenylene sulfide (PPS), and any combination thereof. In an embodiment, at least one seal member 512 may be disposed about the axis of the sensor 508 and may not require the support of an at least one seal member housing 528 or a mounting ring 524. In an embodiment, at least one seal back up member 530 may be disposed about the axis of the sensor 508 and may not require the support of an at least one seal member housing 528 or a mounting ring 524. When a seal member 512 is disposed about the axis of the sensor 508 between the sensor 508 and the housing 504, the seal member 512 may sealingly engage the housing 504 and substantially prevent fluid communication from the exterior of the housing past the seal member 512.

In an embodiment, an optional elastomer 534 may be disposed on at least a portion of the wall of the cavity 506. The elastomer 534 may comprise a material configured to minimize lateral motion of the sensor 508 when impacted by a pressure wave. The elastomer 534 may be disposed around a portion of the wall of the cavity 506 adjacent to the sensor 508 and the wiring 526. The elastomer 534 may also be configured to reduce the deflection of the sensor 508 and the wiring 526. In an embodiment, the elastomer 534 may also coat the cavity 506 so that if a fluid enters the cavity, the elastomer 534 may protect the housing 504 from the fluid. In an embodiment, when an elastomer 534 is disposed on at least a portion of the wall of the cavity 506, the elastomer 534 provides a seal protecting the housing 504 from fluid that may form or seep through the seal member 512.

In an embodiment, a pocket 536 disposed in the housing comprises at least one compressible component (e.g., foam, a compressible fluid, a porous elastomer, etc.) and is disposed between at least a portion of the sensor 508 and at least a portion of the housing 504. The at least one pocket may be is disposed between the housing 504 and portion of the sensor 508 and the wiring 526. In an embodiment, the at least one pocket 536 may be encapsulated and/or retained by an encapsulant and/or a foam abutting the elastomer 534 and/or disposed between the between at least a portion of the sensor 508 and at least a portion of the housing 504. When the apparatus 500 experiences a pressure wave, a compressible component (e.g., foam) disposed within a pocket 536 may provide compressibility for the elastomer 534. The at least one pocket 536 comprising at least one compressible component may also dampen deflection of the sensor 508 and the wiring 526 in conjunction with the elastomer 534.

Figure 7B:
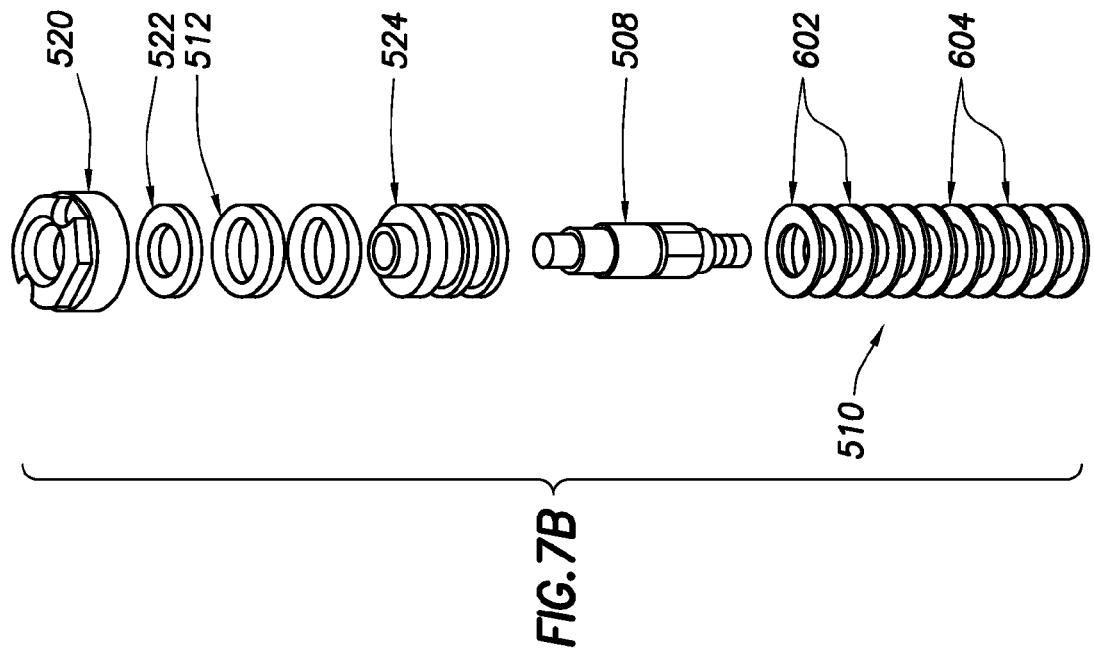
FIGS. 7A-7B are schematic views of embodiments of sensor configurations.
Figure 7A:
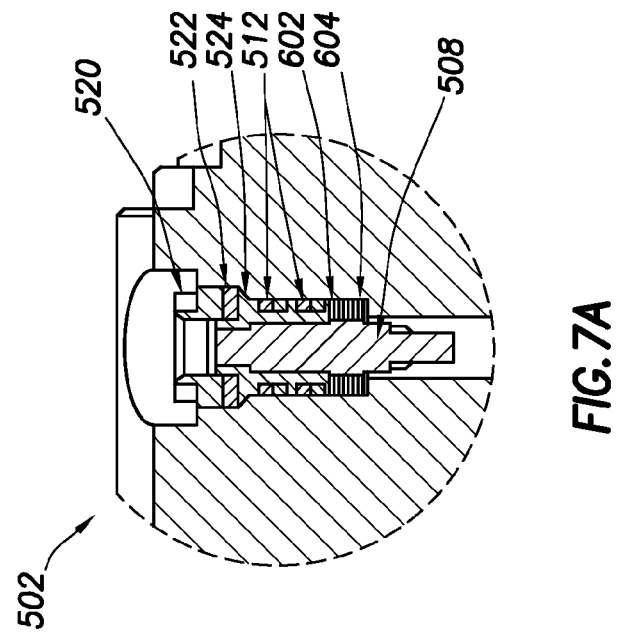

As disclosed in FIGS. 7A and 7B, a shock mitigating member 510 may be disposed between at least one end of the sensor 508 and the housing 504. The shock mitigating member 510 is generally disposed about the axis of the sensor 508 and in contact with the mounting ring 524 on one end and the housing 504 on the opposite end. The end of the shock mitigating member 510 engaging the housing may engage a shock mitigating member seat 532 formed in the housing 504. In an embodiment, the shock mitigating member 510 may be disposed adjacent to at least one seal member 512 and/or at least one seal back up member 530. In an embodiment, the shock mitigating member 510 may be in the location of the washer 522 disclosed in FIG. 6 and/or the washer 522 may be in the location of the shock mitigating member 510. In an embodiment, the shock mitigating member 510 is subject to hydrostatic loads. The shock mitigating member 510 may provide mechanical wave reflection, attenuation, and/or transmission away from the sensor 508 and/or electrical components. For example, when the sensor 508 experience a mechanical wave and/or pressure disturbance, the shock mitigating member 510 may protect the sensor and/or the electrical components, including the electrical wires, from damage and/or distortion. In an embodiment, the shock mitigating member 510 may have a sufficiently high compressive strength to limit or avoid deflection and/or damage to the sensor 508, the mounting ring 524, and/or the wires 526 disposed behind and attached to the sensor 508. In an embodiment, the wires 520 may be coupled to a non-transitory computer readable media 536 for receiving a signal from the sensor 508.

FIGS. 7A and 7B illustrate additional views of the shock protection apparatus 502. The shock mitigating member 510 comprises at least two engaging shock mitigating sections 602 and 604. The at least two shock mitigating sections 602, 604 are disposed about the sensor 508 and in contact with each other. The shock mitigating sections 602, 604 generally comprise different materials. For example, the first shock mitigating section 602 comprises a first material and the second shock mitigating section 604 comprises a second material. The use of different materials may provide for an impedance mismatch, thereby reflecting at least a portion of a compression wave incident on the shock mitigating member 510. For example, the first material may comprise a first impedance and the second material may comprise a second impedance such that the impedance of the first material and thus the impedance of first shock mitigating section 602 is different from the impedance of the second material and thus the impedance of the second shock mitigating section 604. In an embodiment, the material of the first shock mitigating section 602 may comprise a metal such as aluminum and the second shock mitigating section 604 may comprise a polymer such as PEEK. In an embodiment, the ratio between the impedance of the first material and the impedance of the second material is greater than 1.1. In an embodiment, the impedance of each of the shock mitigating sections comprises a mechanical/acoustic impedance.

In an embodiment, when the shock mitigating member 510 is disposed about the axis of the sensor 508 between at least one end of the sensor 508 and the housing 504, the shock mitigating member 510 may reduce the transmission of at least a portion of a pressure wave produced by the detonation of a perforating gun to the sensor 508. Specifically, the shock mitigating member 510 may allow transmission of the pressure wave into and through, for example, the first shock mitigating members 602 with a first impedance. When the mechanical wave travels through the first shock mitigating component 602 with the first impedance and impacts the interface between the first shock mitigating section 602 the second shock mitigating section 604 having a second impedance, the change in impedance between the first reflective section 602 and the second reflective section 604 causes at least a portion of the pressure wave to reflect off of the interface, thereby reducing the transmission of the pressure wave to the sensor 508.

The shock mitigating member 510 may comprise a plurality of shock mitigating sections. In this embodiment, no two shock mitigating sections in contact with each other may have the same impedance. Thus, for example, the first shock mitigating section 602 may not make contact along the axial direction of the sensor 508 with another shock mitigating section with the same impedance as the first shock mitigating section 602. In an embodiment, a sufficient number of shock mitigating sections may be used to fill any space between the mounting ring 524 and the housing 504. In an embodiment, spacers may be disposed between at least two of the shock mitigating sections of the shock mitigating member 510 so that the shock mitigating sections may be retained in compression. Additionally, spacers may be provided so that the shock mitigating member 510 may be retained in compression in conjunction with at least one other component of the shock protection apparatus 500. In another embodiment, the retaining member 520 may be torqued using threads to provide the compression without the use of spacers on shock mitigating sections and/or between the shock mitigating member 510 and another component of the shock protection apparatus 502.

In an embodiment, at least two adjacent engaging shock mitigating sections of the plurality of shock mitigating sections may provide an acoustic impedance mismatch, such that pressure wave energy incident on the shock mitigating section is partly reflected at the interface between adjacent sections, thereby attenuating the pressure wave energy traveling through the sections. A variety of methods of implementing this impedance mismatch are consistent with the present disclosure. For example, an impedance mismatch may be achieved by rapidly changing cross-section or density of the spacer relative to the remainder of the perforation tool assembly.

The shock mitigating member 510 may serve to attenuate mechanical wave content above an isolation frequency while allowing lower frequencies to pass through. In an embodiment, the effective axial and shear stiffness of the shock mitigating member 510 can be tuned to achieve a desirable isolation frequency for protection from mechanical waves. In an embodiment, the shock mitigating member 510 is configured to reduce transmission of a mechanical wave between the housing 504 and the sensor 508. In an embodiment, the shock mitigating member 510 may be configured to mitigate and/or reflect at least 5% of the pressure wave traveling between the housing 504 and the sensor 508. In an embodiment, the shock mitigating member 510 may be configured to mitigate and/or reflect at least about 10%, at least about 15%, at least about 20%, at least about 25%, at least about 30%, at least about 35%, at least about 40%, at least about 45%, or at least about 50% of the pressure away traveling between the housing 504 and the sensor 508. In an embodiment in which the sensor 508 comprises a pressure sensor, the isolation frequency may be about 1 kHz and/or above about 1 kHz. However, isolation may be constrained by the required seal geometry and maximum allowable deflection under hydrostatic pressure.

In an embodiment, a method of measuring a shock mechanical in a wellbore comprises disposing a sensing subassembly 500 comprising a sensor 508 and a shock protection apparatus 502 into a wellbore, where the sensing subassembly 500 comprises a housing 504 with a cavity 506 extending into the housing 504, and a sensor 508 disposed at least partially within the cavity 506. The shock protection apparatus 502 may comprise a shock mitigating member 510 disposed between at least one end of the sensor 508 and the housing 504. The sensing subassembly 500 may then receive at least one mechanical wave (e.g., a shock wave, etc.) within the wellbore. The mechanical wave transmission to the sensor 508 may then be reduced using a shock mitigating member 510. A least one parameter associated with the pressure wave can then be sensed before, during, and/or after a perforating event. The at least one parameter may comprise a change in dynamic pressure. The sensor 508 may generate at least one signal in response to the sensing and at least one signal can be transmitted to and stored in a non-transitory computer readable media 536. In an embodiment, the at least one pressure wave comprises a detonation mechanical wave generated by at least one perforating gun disposed within the wellbore.

In an embodiment, a method of absorbing at least a portion of a mechanical wave using a shock protection apparatus comprises at least one sensor 508 receiving a pressure wave disposed within a cavity 506 of a housing 504, where the at least one sensor 508 is coupled to the housing 504 at a first end via a shock mitigating member 510. A shock mitigating member 510 reflects and/or mitigates at least a portion of the pressure wave. The shock mitigating member 510 may also provide shock isolation by creating a softer support between the sensor 508 and the housing 504. The shock mitigating member 510 may comprise a material that is softer than the sensor 508 and the housing 504. The reflection of the pressure wave may include the transmission of a mechanical wave through a first material and onto a second material adjacent to the first material, where the first material and the second material are disposed about the axis of the sensor 508. In an embodiment, the first material and the second material are adjacent to the housing. At least one sensor 508 then senses at least one parameter external to the housing.

In an embodiment, a method of absorbing at least a portion of a mechanical wave using a shock protection apparatus further comprises using at least one washer 522 disposed adjacent to the sensor 508 and along the axis of the sensor to attenuate at least a portion of the mechanical wave. In an embodiment, at least one washer 522 attenuating a mechanical wave may be compressed radially. A seal member 512 may be disposed between the sensor 508 and the housing 504, and the seal member 512 may attenuate a mechanical wave by allowing an axial deflection along the axis of the sensor 508 and/or a radial deflection along the axis of the sensor 508 to thereby provide relative movement between the sensor 508 and the housing 504. Such relative motion may at least partially isolate the mechanical wave (e.g., attenuate the mechanical wave). In an embodiment, at least one pocket comprising at least one compressible component may be disposed between at least a portion of the sensor 508 and at least a portion of the housing 504, which may aid in allowing the compressible component to provide a soft support behind the sensor 508. The at least one pocket comprising the compressible component may alternatively and/or additionally provide a soft isolation mount for the back end of the sensor and/or the wiring. In an embodiment, the sensor 508 may be coupled to the housing 504 at a second end by means of at least one washer 522. In an embodiment, the sensor 508 is retained within the cavity 506 extending through the housing 504 by a retaining ring 520 disposed between the sensor 508 and an opening of the cavity 506. The sensor 508 may comprise a dynamic pressure transducer, a pressure sensor, a temperature sensor, a logging sensor, and/or an optical sensor.

Figure 8:
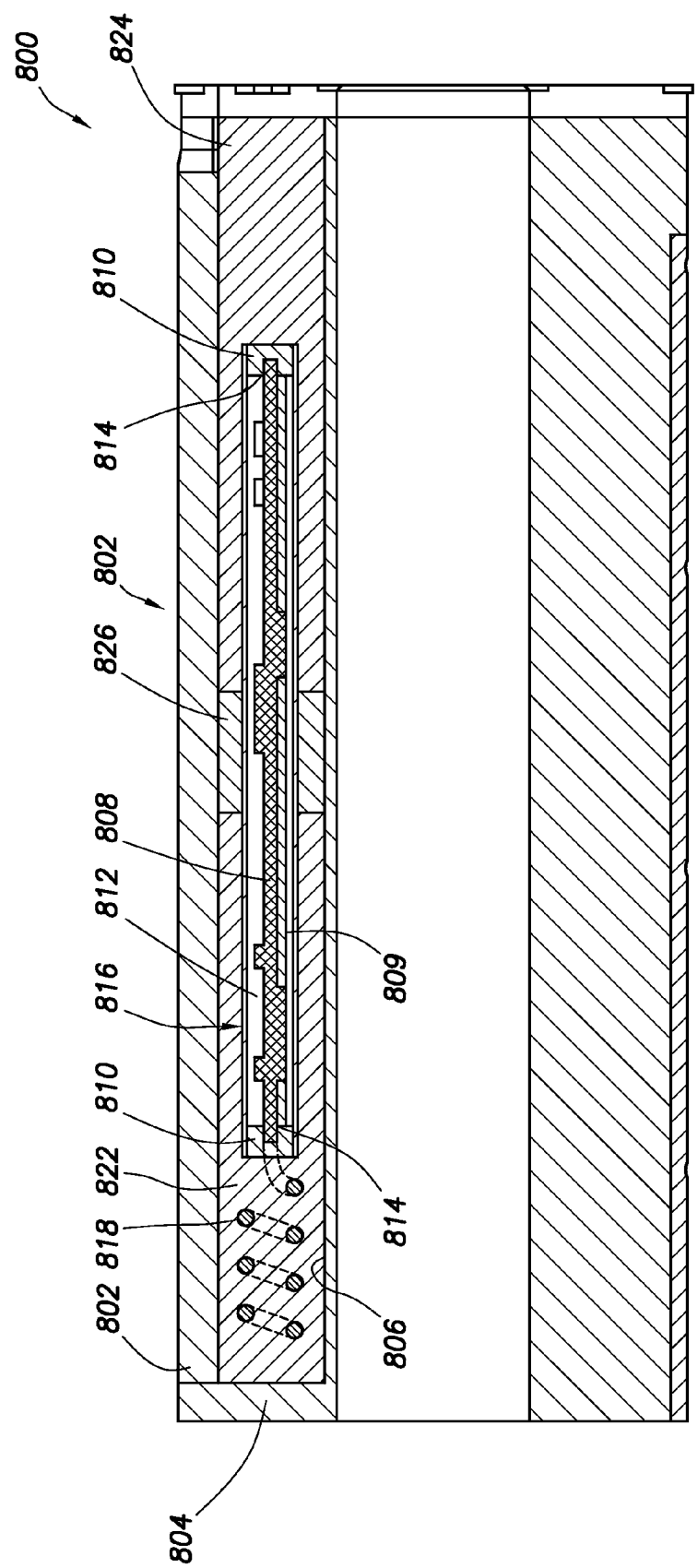
FIG. 8 is still another schematic view of an embodiment of sensor configurations.

In an embodiment, a shock protection apparatus may be used to protect electronic boards and/or batteries. In FIG. 8, another cross-sectional view of a sensing subassembly 800 is representatively illustrated. The sensing subassembly 800 for use in a downhole tool may generally comprises a housing 804 and a cavity 806. An electronic board 808 may be disposed within the cavity 806. A shock protection apparatus 802 generally comprises a stiffening member and a spring member 822. The shock protection apparatus 802 may be configured to limit deflection and/or flexing of the electronic board 808 along the axis of the sensing subassembly 800 and radially about the axis of the subassembly 802. In an embodiment, the shock protection apparatus 802 may also comprise a tubular member 816, a polymeric material 812, and an isolation mount 814.

In an embodiment, the electronic board 808 is disposed in the cavity 806 of the housing 804 at an angle that is generally parallel to the axis of the subassembly 802. Due to the spatial constraints within the housing 804, the cavity 806 may be sized so that the electronic board 808 fits securely within the cavity 806 and configured so that the electronic board 808 does not interfere with, for example, the detonation cord 30 (depicted in FIG. 5) while still shielding the electronic board 808 from the exterior of the housing 804. In an embodiment, the electronic board 808 may be disposed so that the primary face of the electronic board 808 faces inwards or outwards. In an embodiment, the electronic board 808 may be disposed at a non-perpendicular angle relative to the longitudinal axis of the sensing subassembly 800. The electronic board 808 and the cavity 806 may be arranged so that the electronic board 802 is able to fit securely within the sensing subassembly 800 and reduce the transmission of a mechanical wave produced, for example, from the detonation of a perforating gun. In an embodiment, the at least one electronic board 808 may be disposed so that the electronic board 808 is not in fluid communication with (e.g., is substantially fluidly isolated from) an exterior of the housing 504.

In an embodiment, a stiffening member 809 may engage the electronic board 808 and be configured to limit flexing of the electronic board 808. In an embodiment, the stiffening member 809 may be used without any other stiffening component such as a tubular member 816. In some embodiments, a combination of both a stiffening member and a tubular member 816 may be used. In an embodiment, the shock protection apparatus 800 may comprise the stiffening member engaged to each end of the electronic board 808 (e.g., such as a stiffening strip 810 disposed along an end of the electronic board 808). In an embodiment, a stiffening member 809 may comprises a first stiffener disposed on at least a first side of the electronic board and a second stiffener disposed on at least a second side of the electronic board. In some embodiments, at least one stiffening member 809 may engage at least one side of the electronic board 808. For example, the stiffening member 809 may be disposed along a side aligned with the longitudinal axis of the electronic board 808 and/or a side perpendicular to the longitudinal axis of the electronic board 808 (e.g., as illustrated by stiffening strip 810 in FIG. 8). In an embodiment, the stiffening member 809 comprises a metal or composite beam engaged to at least one side of the electronic board 808. The stiffening member 809 may be configured to resists moments that form across an electronic board 808 when a compression wave is transmitted to the electronic board 808. This feature may reduce stress across solder joints and the other various components disposed on the electronic board 808 to maintain the functionality and prolong the life of the electronic board 808.

The stiffening member 810 may also be surrounded by (e.g., staked and/or potted in) a polymeric material 812. As shown in FIG. 8, the polymeric material 812 may surround a least a portion of the electronic board 808. In an embodiment, the polymeric material 812 may stake the electronic board to protect components on the electronic board. In an embodiment, the electronic board 808 may be potted and/or encapsulated in the polymeric material 812. Furthermore, in an embodiment, the electronic board 808 may be potted and/or encapsulated in the polymeric material 812 within a tubular member 816, to be discussed in more detail herein. The polymeric material may provide heat dissipation on the electronic board 808. The polymeric material 812 may be configured to provide support to at least one electronic component on the electronic board 808 and provide a shear coupling between the electronic board 808 and the cavity 806, or the electronic board 808 and the tubular member 816. The polymeric material 812 may also be configured to provide a secondary load path and support for at least one solder joint on the electronic board 808. The polymeric material 812 may also at least partially react to inertial loads on the electronic board 808 and provide support to the electronic components disposed thereon. In an embodiment, when a polymeric material 812 is disposed on at least a portion of the electronic board 808, the polymeric material 812 may reduce and/or limit flexing of the electronic board 808 along the axis of the subassembly and radially about the axis of the subassembly 802. For example, flexing may be produced by a mechanical wave traveling through the sensing subassembly 800 due to a mechanical wave. When a polymeric material 812 is disposed on at least a portion of at least one electronic wire extending from the electronic board 808, the polymeric material 812 may support and protect the electronic wiring 818 from damage due to a mechanical wave. Dampening and/or limiting the motion of the wiring subject to a pressure wave may also minimize electronic noise that may interfere with a signal from a sensor and/or being processed on the electronic board. In an embodiment, an isolation frequency of about 1 kHz may be desired for the electronic board 808 and the wiring 818. In some embodiments, a frequency of 1 kHz or greater may be reduced (e.g., a frequency between about 1 kHz and about 100 kHz).

In an embodiment, the shock protection apparatus 802 may comprise a tubular member 816. The tubular member 816 may be disposed about at least a portion of the electronic board 808 and may be configured to limit flexing of the electronic board 808 along the axis of the subassembly and radially about the axis of the subassembly 802. In an embodiment, the tubular member 816 may be configured to be electrically connected to a ground reference on the board to minimize electromagnetic noise and interference. In an embodiment, the tubular member 816 may be disposed within the cavity 806. The polymeric material 812 may serve to couple the tubular member 816 to the electronic board 808. As disclosed in FIG. 8, the tubular member 816 may extend through at least a portion of the cavity 806 of the housing 804. The tubular member 816 may be configured to contain the electronic board 808.

Figure 9C:
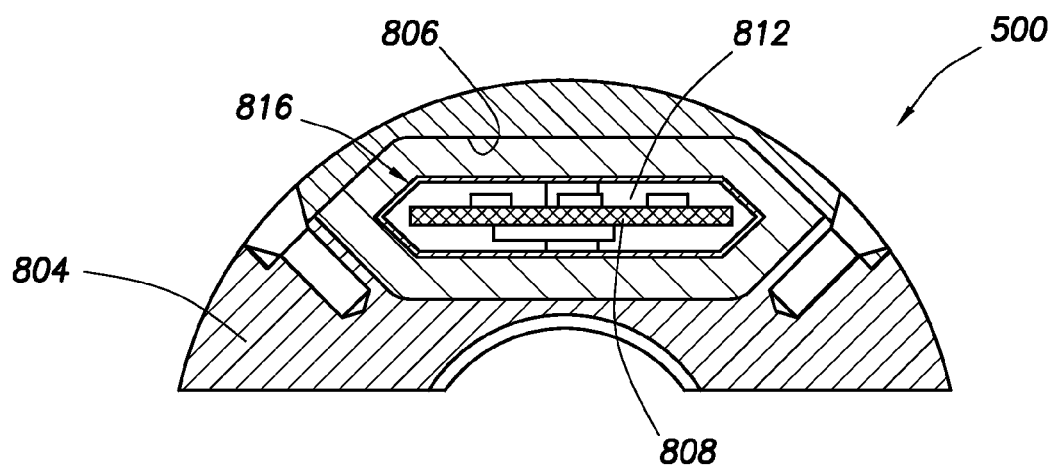
FIG. 9C is still another schematic view of an embodiment of sensor configurations.

As illustrated in FIGS. 9A-9C, the tubular member 816 may have a hexagonally shaped cross-section. In some embodiments, the cross-section of the tubular member 816 may comprise an oval shape, a polygonal shape, a circular shape, or a non-circular shape. In an embodiment, the cross-section of the tubular member 816 may comprise an open shape (e.g., a non-closed cross-sectional shape) having one or more openings along the cross section such as a c-shape, partial oval shape, partial non-circular shape or the like. The shape of the tubular member 816 may be configured (e.g., in size and/or in shape) to fit securely within the cavity 806 of the housing 804 of the sensing subassembly 800 while allowing for the inclusion of the additional structures within the sensing subassembly 800 such as a detonation cord and the like. The shock protection apparatus 802 may also comprise a material layer 820. The material layer 820 may be disposed on at least a portion of at least one side of the electronic board 808, as disclosed in FIGS. 9A-9C. For example, the material layer may be disposed on one or more components between the one or more components and the potting and/or polymeric material. The material layer 820 may be configured to provide flexibility and/or compliance around the sensitive components of the electronic board 808 to protect the sensitive components from thermal expansion and/or shrinkage of the polymeric material. In an embodiment, the material layer 820 may be disposed over at least one primary face of the electronic board 808, which may comprise the face with the most electronic components. In an embodiment, the primary face of the electronic board 808 may comprise a face comprising fragile components. The material layer 820 comprises a softer material than the polymeric material 812, and in an embodiment, may be a conformal coating. The material layer 820 may be disposed over at least one solder joint disposed on the face of the electronic board 808. When a material layer 820 is disposed over at least a portion of at least one side of an electronic board 808, the material layer 820 may provide support and strength for at least one solder joint disposed on at least one side of the electronic board when the electronic board is exposed to a pressure wave, such as during a perforating event.

The shock protection apparatus 802 may further comprise a spring member 822 coupling the electronic board 808 and/or the tubular member 816 to the inner walls of the cavity 806. A pocket 826 may be disposed between two portions of the spring member 822 to allow independent movement of each portion. The spring member 822 may be configured to provide an isolation mount reducing transmission of compression waves and/or the limiting the amplitude of any compression waves transmitted to the electronic board 808 through the shock protection apparatus 802. The spring member 822 may be configured to limit the maximum deflection of the electronic board 808 and limit or prevent contact between the electronic board 808 and other surrounding surfaces. Additionally, the spring member 822 may be configured to protect any electronic wires from flexing and/or stretching. In an embodiment, the spring member 822 may be configured to reduce or attenuate mechanical wave transmission above about 500 Hz. The spring member 822 may be disposed around the electronic board 808 and/or the stiffening member 809, and the spring member 822 may couple the electronic board 808 with at least one wall of the cavity 806. The spring member 822, in an embodiment, may be engaged with at least a portion of a tubular member 816 retaining the electronic board 808. In an embodiment, the spring member 822 may be configured to limit deflection of the electronic board 808 along the axis of the subassembly and radially about the axis of the subassembly 802. In an embodiment, the polymeric material 812 may be disposed on at least a portion of at least one electronic wire 818 (as shown in FIG. 5) extending from the electronic board 808 to support the electronic wire 818 from deflection and damage from mechanical waves during detonation of a perforating gun.

In an embodiment, the polymeric material 812 may extend over the board and serve the function of the spring member 822, potentially replacing the spring member 822 if the spring member 822 is not present. For example, the subassembly 802 may not comprise the tubular member 816 so that the polymeric material 812 provides the function of the spring member 822.

In an embodiment, a first spring member 822 comprising an elastomer may be disposed at a first end of the cavity 806 and a second spring member 824 comprising an elastomer may be disposed at a second end of the cavity 806. As disclosed in FIG. 8, the first spring member 822 may be disposed over a portion of the electronic board 808 at a first end of the electronic board 808 and the second spring member 824 may be disposed over at least a portion of the electronic board 808 at a second end of the electronic board 808. The first spring member 822 and/or the second spring member 824 may retain the electronic board 808 in the cavity 806. The first spring member 822 disposed at a first end of the cavity 806 may be configured to engage at least a portion of the cavity 806 and at least a portion of the polymeric material 812, and the second spring member 824 disposed at a second end of the cavity 806 may be configure to engage at least a portion of the cavity 806 and at least a portion of the polymeric material 812. The first spring member 822 may also be configured to engage at least a portion of the tubular member 816, and the second spring member 824 may be configured to engage at least a portion of the tubular member 816. In an embodiment, a first elastomer 822 disposed at a first end of the cavity 806 may attenuate at least a portion of the mechanical waves across the electronic board 808. In an embodiment, a second elastomer 824 disposed at a second end of the cavity 806 may attenuate at least a portion of the mechanical waves across the electronic board 808.

The first spring member 822 and second spring member 824 may be configured to limit deflection of the tubular member 816, and thereby the electronic board 808, in the axial and radial directions along the axis of the subassembly 802. The pocket 826 or void may be disposed between the first spring member 822 and the second spring member 824. In an embodiment, an elastomer or a foam may be disposed in the pocket 826 between the first spring member 822 and the second spring member 824. The material in the pocket 826 may be used to aid in manufacturing the shock protection apparatus 802 by providing the desired spacing between spring member 822, 824 during installation.

In an embodiment, one or more electronic connections 818 (e.g., a wire) may be coupled to the electronic board 808 to allow communication between various components such as sensors and the electronic board 808. The first spring member 822 and/or the second spring member 824 may encapsulate at least one wire 818 extending from the electronic board 808. The at least one wire 818 extending from the electronic board 808, which may be encapsulated by the first spring member 822 and/or the second spring member 824, may be coiled or formed in a spiral or helical configuration. The first spring member 822 and/or the second spring member 824 may be configured to limit deflection in the axial and radial directions along the axis of subassembly of at least one wire extending from the electronic board. The first spring member 822 and the second spring member 824 may limit deflection of the electronic board 808 and/or the wiring 818 engaging the electronic board 808 caused by a mechanical wave impacting the sensing subassembly 800. For example, the first elastomer 822 and/or the second elastomer 824 may be configured to support at least one electronic wire 818 engaging the electronic board 808 so that the at least one electronic wire 818 may not be damaged, broken, and/or disengaged from the electronic board during the detonation of a perforating gun. In an embodiment, coiling and/or encapsulating at least one electronic wire 818 within at least the first elastomer 822 and/or the second elastomer 824 may serve to attenuate a mechanical wave incident on the electronic board that propagates to the electronic wire 818 and/or causes relative motion between the electronic board and the electronic wire 818.

While the spring members 822, 824 are illustrated as filling portions of the cavity 806, the spring member may also take the form of an isolation mount disposed between the electronic board 808 and the stiffening member 810. For example, the isolation mount may comprise a mechanical spring and/or a damper arrangement, such as, for example, a coil spring or a flexure encapsulated in rubber. In an embodiment, the isolation mount may comprise of a spring on each end of the electronic board 808 and/or radial o-rings. In some embodiments, the spring members 822, 824 may not be present and/or may be integrally formed with the polymeric material 812. In this embodiment, the polymeric material 812 may extend over the board and serve the function of the spring member 822, potentially replacing the spring member 822 if the spring member 822 is not present. For example, the subassembly 802 may not comprise the tubular member 816 so that the polymeric material 812 provides the function of the spring member 822.

In an embodiment, a material layer 820 may be disposed over at least a portion of at least one face of the electronic board 808 to attenuate the mechanical wave. The material layer 820 may comprise a softer material than the polymeric member 812. The relatively softer material layer 820 may provide for an amount of compliance or movement between the components (e.g., electrical connections, solder joints, etc.) on the electronic board 808 and the polymeric material 812. This may help to limit or prevent loading the electronic components above a failure point when the electronic board 808 is subjected to a mechanical wave. In an embodiment, the material layer 820 may be disposed over at least one solder joint.

In an embodiment, the sensing subassembly 800 comprising the shock protection apparatus 802 may be used to protect an electronic component from a mechanical wave. When a mechanical wave is incident upon and/or travels through the housing 804 containing an electronic component such as an electronic board 808 disposed in the cavity 806, a stiffening member 810 coupled to the electronic board 808 and a polymeric material 812 disposed about the electronic board 808 may attenuate the mechanical wave to limit the amplitude and/or frequencies impacting the electronic board 808. The polymeric material 812 disposed on at least a portion of the electronic board 808 may provide a secondary load path and/or support for at least one solder joint on the electronic board 808. The mechanical wave may be attenuated in the axial and radial directions along the axis of the subassembly 802. The stiffening member 810 may engage the electronic board 808 and one or more spring members 822, 824 may be disposed on at least a portion of the electronic board 808. In an embodiment, a spring members 822, 824 may be coupled to the electronic board 808 and the cavity 806. The spring members 822, 824 may support one or more electronic components disposed on the electronic board 808 and aid in protecting the electronic components from the mechanical wave including, for example, any resulting inertial loads on the electronic board. In an embodiment, first spring member 822 may be disposed on at least a first end of the electronic board 808 and a second spring member 824 may be disposed on at least a second end of the electronic board 808 to couple the tubular member 816 within the cavity 806. In an embodiment, the electronic board 808 may be utilized to carry out at least one function after the sensing subassembly 800 experiences at least one mechanical wave resulting from a perforating event.

Figure 10:
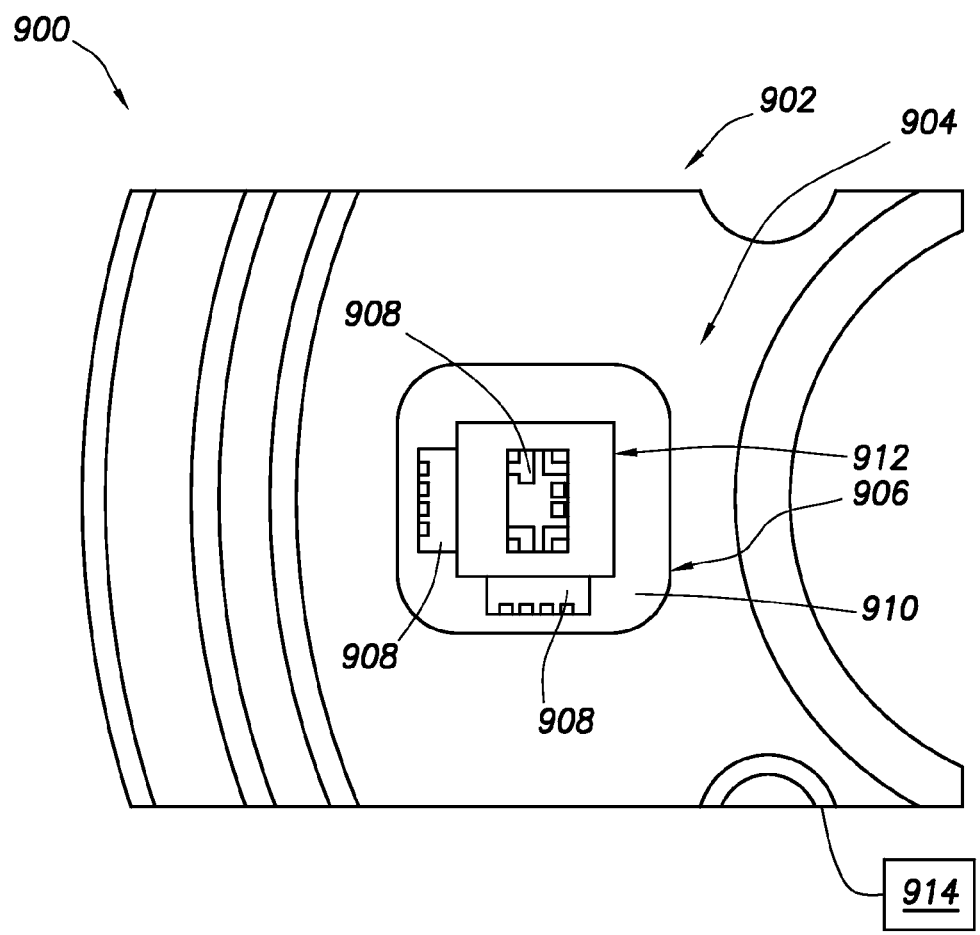
FIG. 10 is yet another schematic view of an embodiment of sensor configurations.
Figure 11:
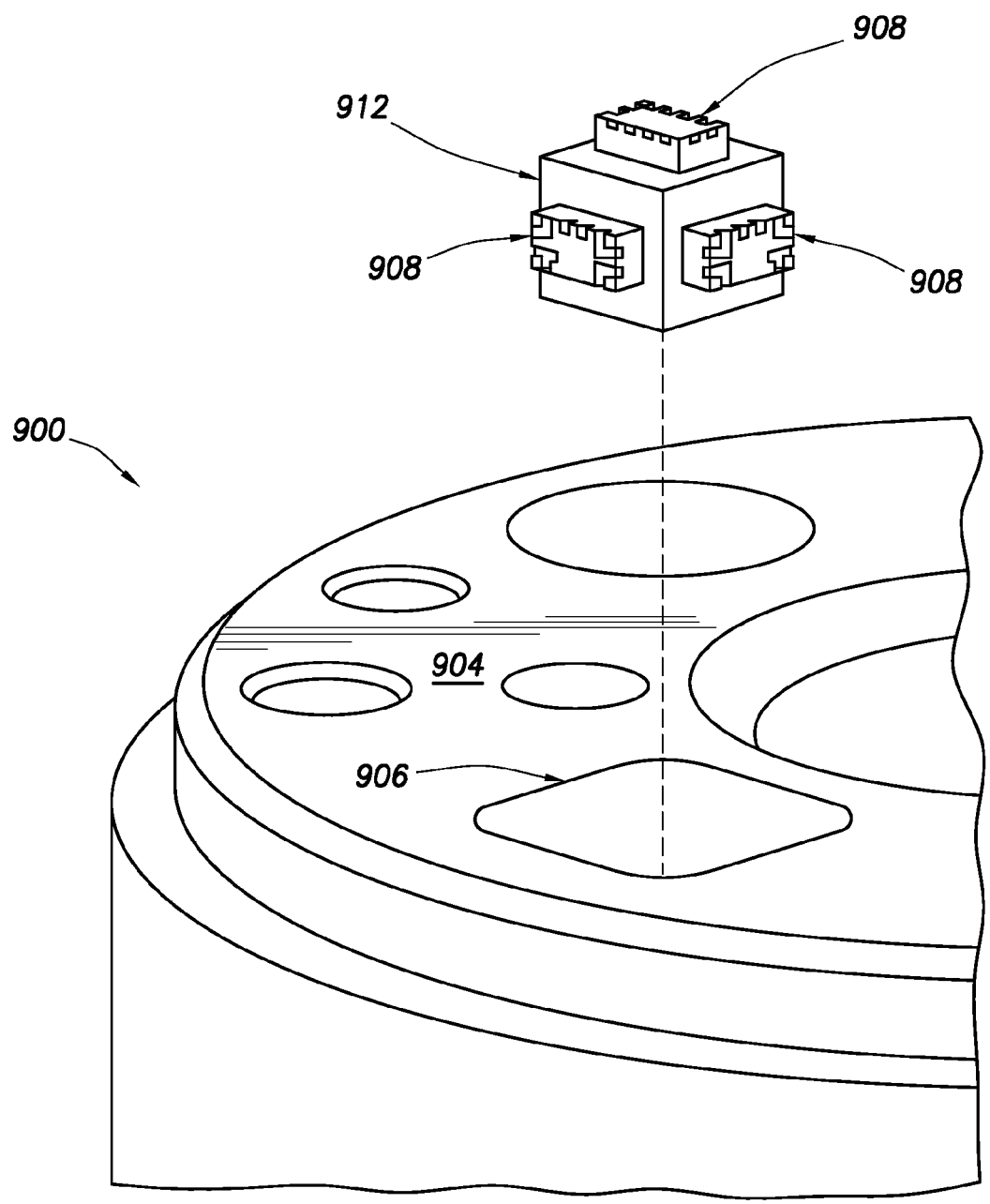
FIG. 11 is another schematic view of an embodiment of sensor configurations.
Figure 12:
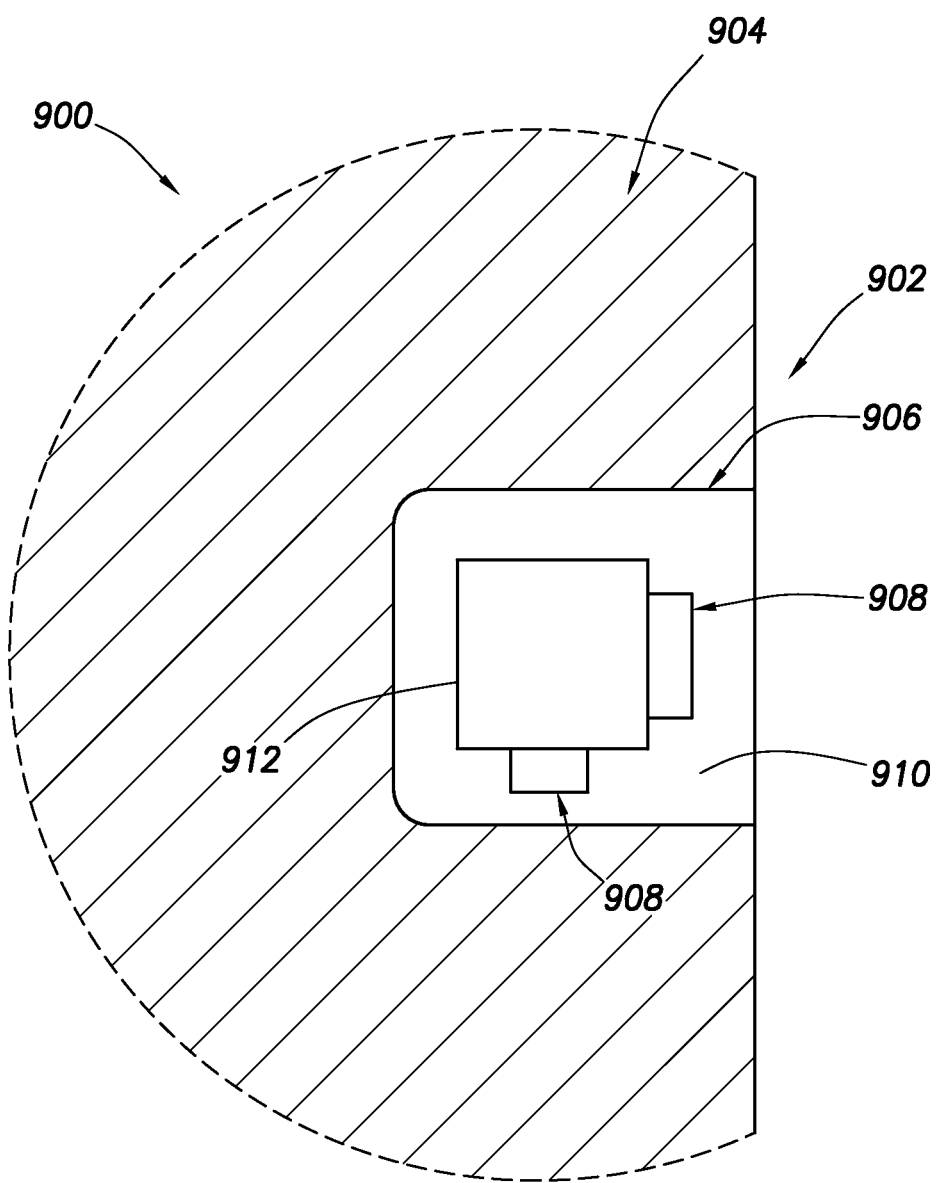
FIG. 12 is still another schematic view of an embodiment of sensor configurations.

In an embodiment, a sensing subassembly 900 may comprise a shock protection apparatus used to protect a sensor 908 disposed within the sensing subassembly 900. As shown in FIGS. 10, 11, and 12, the sensing subassembly 900 comprises a housing 904, a cavity 906 disposed within the housing 904, and at least one sensor 908 disposed within the cavity 906. The shock protection apparatus 902 comprise at least one isolating member 910 disposed within the cavity 906 about at least a portion of the sensor 908. The at least one isolating member 910 is configured to attenuate at least a portion of the frequency components of a mechanical wave above a threshold frequency (e.g., above a given frequency, above a frequency amplitude, etc.) and transmit at least a portion of frequency components below the threshold to the at least one sensor 908. In an embodiment, the shock protection apparatus 902 may be configured to maintain the functional integrity of the at least one sensor 908 disposed within the cavity 906 while in close proximity to a perforating gun during a perforating event.

In an embodiment, the cavity 906 may be disposed within the housing 904 and configured so that the housing 904 surrounds the cavity 906. In this embodiment, a sensor 908 disposed within the cavity 906 may not be exposed to the exterior of the housing 904 in any direction. In some embodiments, the cavity 906 may be disposed so that at least one side of the cavity 906 is exposed to the exterior of the cavity 906 and/or the interior of the sensing subassembly 902 (e.g., the interior volume of the shock protection apparatus 900). This configuration may allow for easier insertion of at least one sensor 908 such as an accelerometer into the cavity 906.

At least one sensor 908 may disposed within the cavity 906 of the housing 904 of the shock protection apparatus 500. In an embodiment, the sensor 908 may comprise an accelerometer. As disclosed in FIGS. 10 and 11, three sensors 908 may be disposed within the cavity 906. In an embodiment, the sensors 908 may be mounted on a mounting member 912. Furthermore, as disclosed in FIGS. 10 and 11, three sensors 908 are mounted on a triaxial mounting member 912 so that each sensor 908 may sense a parameter in all three Cartesian directional coordinates. In an embodiment, the mounting member 912 may be a cube shape, a spherical shape, or any shape that would function to mount at least one sensor 908.

In an embodiment, the isolating member 910 may be disposed within the cavity 906 and configured to attenuate at least a portion of frequency components of a mechanical wave above a threshold and transmit at least a portion of frequency components below the threshold frequency to the at least one sensor 908. The isolation member 910 may engage at least one portion of at least one side of the cavity 906, and the isolation member 910 may encapsulate the at least one sensor 908 and/or a mounting member 912. In an embodiment, the isolation member 910, may comprise a polymeric material configured to provide a spring function around the at least one sensor. This feature may reduce deflection and/or damage to the at least one sensor 908.

In an embodiment, the isolation member 910 may provide for sufficient compliance to allow for effective isolation of the sensor from at least a portion of the mechanical wave above a threshold frequency, which may comprise a frequency content that may cause damage to the sensor 908. In this embodiment, the threshold frequency may be between about 10 kHz and about 100 kHz, between about 20 kHz and about 50 kHz, or between about 25 kHz and about 40 kHz. In an embodiment, the threshold frequency may be about 30 kHz. The desired threshold frequency may be obtained in one, two, and/or three axes based at least in part on the modulus of the isolation member 910 and the geometry of the isolation member 910 (e.g., thickness, depth, etc.) around the at least one sensor 908 and/or the mounting member 912. The isolation member 910 may also provide sufficient compliance to allow for effective isolation of a mounting member 912. Since the isolation member 910 may attenuate frequencies above a threshold frequency and transmit frequency below a threshold frequency, an accelerometer, for example, may sense desired parameters below a threshold frequency while avoiding damage and interference from frequencies above a threshold frequency.

In an embodiment, the polymeric material may comprise a glass transition temperature above the expected operating conditions within the wellbore. This feature may allow for isolation performance at elevated working temperatures. For example, when the polymer exceeds the glass transition, it may soften and attenuate frequencies lower than desired. Furthermore, a glass transition temperature above the expected operating temperature may prevent the isolation member from transitioning and flowing when the shock protection apparatus 900 is in place within the warmer temperatures of the wellbore. In an embodiment, the glass transition temperature may be above about 100 degrees Celsius, above about 125 degrees Celsius, above about 150 degrees Celsius, above about 175 degrees Celsius, or above about 200 degrees Celsius. In an embodiment, the glass transition temperature may be below about 300 degrees Celsius.

A method of measuring a mechanical wave event in a wellbore comprises disposing a sensing subassembly 900 comprising shock protection apparatus 902 into a wellbore. The shock protection apparatus 902 may receive at least one mechanical wave within the wellbore, which may include a shock wave and/or a pressure disturbance. When the shock protection apparatus 902 receives at least one mechanical wave, the shock protection apparatus 902 attenuates at least a portion of frequency components of at least one mechanical wave above a threshold and transmits at least a portion of the frequency components below the threshold to the sensor 908. The sensor 908 senses at least one parameter associated with the mechanical wave and generates at least one signal in response to sensing at least one parameter. The at least one signal may then be stored in a non-transitory computer readable media 914. The at least one mechanical wave may comprises a shock wave generated by at least one perforation gun disposed in a wellbore.

A method of absorbing mechanical waves using a shock protection apparatus 902 comprises, in an embodiment, attenuating at least a portion of a mechanical wave and transmitting at least a portion of the mechanical wave to the at least one sensor 908. The sensor 908 may sense at least one parameter of the mechanical wave transmitted through the isolation member 910. The isolation member 910 may encapsulate the at least one sensor 908. The isolation member 910 may comprise a polymeric material configured to provide a spring function around the at least one sensor 908. Additionally, a mounting member 912 may be utilized to mount at least one sensor 908. In an embodiment, the isolation member 910 may encapsulate the mounting member 912. Additionally, in an embodiment, the shock protection apparatus 900 and/or the isolation member 910 may attenuate at least a portion of the mechanical wave above a threshold frequency and transmit at least a portion of the mechanical wave below a threshold frequency to the at least one sensor 908. In an embodiment, the shock protection apparatus 902 and/or the isolation member 910 may attenuate mechanical wave frequencies at about 30 kHz or greater and transmitting mechanical wave frequencies below about 30 kHz.

Having described the systems and methods, various embodiments may include, but are not limited to:

In an embodiment, a sensing subassembly for use with a downhole tool comprises a housing, a cavity disposed within the housing, at least one electronic component disposed within the cavity, and at least one isolating member disposed within the cavity. The at least one isolating member is configured to attenuate at least a portion of frequency components of a mechanical wave above a threshold and transmit at least a portion of frequency components below the threshold to the at least one electronic device. The sensing subassembly may also include a mounting member configured for mounting the at least one electronic device.

The mounting member may comprise a triaxial mount configured for orienting at least one electronic device in three axes. The at least one isolating member may comprise a polymeric material configured to provide a spring function around the at least one electronic device. The isolation member may comprise a polymeric material configured to provide a spring function around the mounting member. The threshold may be about 30 kHz or greater. The at least one isolating member may be further configured to maintain the functional integrity of the at least one electronic device disposed within the cavity while in close proximity to a detonating perforating gun. The polymeric material may comprise a glass transition temperature above about 100 degrees Celsius. The threshold may be based on the modulus or thickness of the polymeric material around the at least one electronic device. The threshold may be based on the modulus or thickness of the polymeric material around the mounting member. The isolation member may engage at least a portion of the cavity wall. The cavity may extend into the housing.

In an embodiment, a method of measuring a shock event in a wellbore comprises receiving, by a sensing subassembly, at least one mechanical wave within a wellbore, where the sensing subassembly comprises: a cavity disposed within a housing, at least electronic component disposed within the cavity, and at least one isolating member disposed with the at least one electronic device within the cavity. The method also comprises attenuating at least a portion of frequency components of the at least one mechanical wave above a threshold frequency, transmitting at least a portion of the frequency components of the at least one mechanical wave below the threshold to the electronic device, sensing at least one parameter associated with the at least one mechanical wave, generating, by the electronic component, at least one signal in response to the sensing, and storing the at least one signal in a non-transitory computer readable media. The at least one mechanical wave may comprise a detonation wave generated by at least one perforating gun disposed within the wellbore.

In an embodiment, a method of absorbing a mechanical wave using a shock protection apparatus comprises receiving a mechanical wave at a housing. The housing is disposed in a wellbore, and the housing contains at least one cavity with at least one sensor disposed within the at least one cavity. The at least one sensor is coupled to the housing by an isolation member. The method also comprises attenuating at least a portion of the mechanical wave using the isolation member, transmitting at least a portion of the mechanical wave to the at least one sensor using the isolation member, and sensing at least one parameter of the mechanical wave transmitted to the at least one sensor. The method may also include encapsulating the at least one sensor with the isolation member, and the isolation member may comprise a polymeric material configured to provide a spring function around the at least one sensor. The method may also include mounting the at least one sensor on a mounting member. The method may also include encapsulating the mounting member with the isolation member, and the isolation member may comprise a polymeric material configured to provide a spring function around the mounting member. Attenuating at least the portion of the mechanical wave may comprise attenuating above a threshold frequency, and transmitting at least a portion of the mechanical wave may comprise transmitting below a threshold frequency to the at least one sensor. Attenuating at least a portion of the mechanical wave may comprise attenuating mechanical wave frequencies at about 30 kHz or greater, and transmitting mechanical wave frequencies may comprise transmitting mechanical wave frequencies below about 30 kHz.

It is to be understood that the various embodiments described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A sensing subassembly for use with a downhole tool comprising:
   a housing;
   a cavity, wherein the cavity is disposed within the housing;
   at least one electronic component disposed within the cavity; and
   at least one isolating member disposed within the cavity, wherein the at least one isolating member is configured to attenuate at least a portion of frequency components of a mechanical wave above a threshold and transmit at least a portion of frequency components below the threshold to the at least one electronic device.

2. The sensing subassembly of claim 1, further comprising a mounting member configured for mounting the at least one electronic device.

3. The sensing subassembly of claim 2, wherein the mounting member comprises a triaxial mount configured for orienting at least one electronic device in three axes.

4. The sensing subassembly of claim 1, wherein the at least one isolating member comprises a polymeric material configured to provide a spring function around the at least one electronic device.

5. The sensing subassembly of claim 2, wherein the isolation member comprises a polymeric material configured to provide a spring function around the mounting member.

6. The sensing subassembly of claim 1, wherein the threshold is about 30 kHz or greater.

7. The sensing subassembly of claim 1, wherein the at least one isolating member is further configured to maintain the functional integrity of the at least one electronic device disposed within the cavity while in close proximity to a detonating perforating gun.

8. The sensing subassembly of claim 4, wherein the polymeric material comprises a glass transition temperature above about 100 degrees Celsius.

9. The sensing subassembly of claim 4, wherein the threshold is based on the modulus or thickness of the polymeric material around the at least one electronic device.

10. The sensing subassembly of claim 5, wherein the threshold is based on the modulus or thickness of the polymeric material around the mounting member.

11. The sensing subassembly of claim 1, wherein the isolation member engages at least a portion of the cavity wall.

12. The sensing subassembly of claim 1, wherein the cavity extends into the housing.

13. A method of measuring a shock event in a wellbore comprising:
   receiving, by a sensing subassembly, at least one mechanical wave within a wellbore, wherein the sensing subassembly comprises:
      a cavity disposed within a housing,
      at least electronic component disposed within the cavity, and
      at least one isolating member disposed with the at least one electronic device within the cavity;
   attenuating at least a portion of frequency components of the at least one mechanical wave above a threshold frequency;
   transmitting at least a portion of the frequency components of the at least one mechanical wave below the threshold to the electronic device;
   sensing at least one parameter associated with the at least one mechanical wave;
   generating, by the electronic component, at least one signal in response to the sensing; and
   storing the at least one signal in a non-transitory computer readable media.

14. The method of claim 13, wherein the at least one mechanical wave comprises a detonation wave generated by at least one perforating gun disposed within the wellbore.

15. A method of absorbing a mechanical wave using a shock protection apparatus comprising:
   receiving a mechanical wave at a housing, wherein the housing is disposed in a wellbore, wherein the housing contains at least one cavity with at least one sensor disposed within the at least one cavity, wherein the at least one sensor is coupled to the housing by an isolation member;
   attenuating at least a portion of the mechanical wave using the isolation member;
   transmitting at least a portion of the mechanical wave to the at least one sensor using the isolation member; and
   sensing at least one parameter of the mechanical wave transmitted to the at least one sensor.

16. The method of claim 15, further comprising encapsulating the at least one sensor with the isolation member, wherein the isolation member comprises a polymeric material configured to provide a spring function around the at least one sensor.

17. The method of claim 15, further comprising mounting the at least one sensor on a mounting member.

18. The method of claim 17, further comprising encapsulating the mounting member with the isolation member, wherein the isolation member comprises a polymeric material configured to provide a spring function around the mounting member.

19. The method of claim 15, wherein attenuating at least the portion of the mechanical wave comprises attenuating above a threshold frequency and wherein transmitting at least a portion of the mechanical wave comprises transmitting below a threshold frequency to the at least one sensor.

20. The method of claim 19, wherein attenuating at least a portion of the mechanical wave comprises attenuating mechanical wave frequencies at about 30 kHz or greater and transmitting mechanical wave frequencies comprises transmitting mechanical wave frequencies below about 30 kHz.

* * * * *